(12) United States Patent
Zong

(10) Patent No.: US 11,304,052 B2
(45) Date of Patent: Apr. 12, 2022

(54) SUBSCRIPTION UPDATE METHOD, DEVICE, AND SYSTEM

(71) Applicant: Huawei Technologies Co., Ltd., Shenzhen (CN)

(72) Inventor: Zaifeng Zong, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 12 days.

(21) Appl. No.: 17/012,962

(22) Filed: Sep. 4, 2020

(65) Prior Publication Data

US 2020/0404481 A1    Dec. 24, 2020

Related U.S. Application Data

(63) Continuation of application No. PCT/CN2019/106166, filed on Sep. 17, 2019.

(30) Foreign Application Priority Data

Sep. 30, 2018  (CN) .......................... 201811161753.5

(51) Int. Cl.
*H04W 4/00* (2018.01)
*G06F 15/16* (2006.01)
(Continued)

(52) U.S. Cl.
CPC ............. *H04W 8/183* (2013.01); *H04W 8/08* (2013.01); *H04W 8/186* (2013.01); *H04W 8/26* (2013.01); *H04W 48/16* (2013.01)

(58) Field of Classification Search
CPC ....... H04W 8/183; H04W 8/08; H04W 8/186; H04W 8/26; H04W 48/16
(Continued)

(56) References Cited

U.S. PATENT DOCUMENTS

2013/0301551 A1    11/2013   Ghosh et al.
2014/0229626 A1    8/2014    Qureshi
(Continued)

FOREIGN PATENT DOCUMENTS

CN      1509000 A       6/2004
CN      101860446 A     10/2010
(Continued)

OTHER PUBLICATIONS

S2-1810485, Huawei, "Discussion on the monitoring event subscription to a group," 3GPP TSG-SA2 Meeting #129, Dongguan, P.R. China, Oct. 15-19, 2018, 1 page.
(Continued)

*Primary Examiner* — Mark G. Pannell
(74) *Attorney, Agent, or Firm* — Conley Rose, P.C.

(57) ABSTRACT

A subscription update method includes receiving, by a second mobility management network element (MMNE), event subscription information of a first terminal from a first MMNE, where the event subscription information includes information about a first subscription to a first event, the information about the first subscription includes group subscription identification information, the first terminal belongs to a first user group, and the first event is an event subscribed to by a unified data management (UDM) for the first user group, allocating a second subscription correlation identifier if the second MMNE has no subscription to the first event, and sending a first message to the UDM, including the second subscription correlation identifier and the group subscription identification information.

25 Claims, 12 Drawing Sheets

(51) Int. Cl.
    *H04L 12/28*     (2006.01)
    *H04W 8/18*     (2009.01)
    *H04W 8/08*     (2009.01)
    *H04W 8/26*     (2009.01)
    *H04W 48/16*     (2009.01)

(58) Field of Classification Search
    USPC .......................................................... 370/329
    See application file for complete search history.

(56) References Cited

U.S. PATENT DOCUMENTS

| | | | | |
|---|---|---|---|---|
| 2019/0007500 | A1* | 1/2019 | Kim | H04L 67/141 |
| 2019/0174449 | A1* | 6/2019 | Shan | H04W 76/11 |
| 2019/0254094 | A1* | 8/2019 | Babu | H04W 76/15 |
| 2020/0053828 | A1* | 2/2020 | Bharatia | H04W 68/005 |
| 2020/0337093 | A1* | 10/2020 | Kim | H04W 4/50 |
| 2020/0396587 | A1* | 12/2020 | Kim | H04W 60/04 |
| 2021/0168751 | A1* | 6/2021 | Stojanovski | H04W 60/00 |

FOREIGN PATENT DOCUMENTS

| | | |
|---|---|---|
| CN | 108024270 A | 5/2018 |
| WO | 2018127148 A1 | 7/2018 |

OTHER PUBLICATIONS

S2-183998, Huawei, "Subscription status notification for Event Exposure service," 3GPP TSG-SA WG2 Meeting #127, Apr. 16-20, 2018, Sanya, China, 10 pages.

S2-186898 Nokia, "Add monitoring event cancelltion call flows," 3GPP TSG-SA2 Meeting #128, Jun. 2-6, 2018, Vilnius, Lithuania, 6 pages.

3GPP TS 23.502 V15.3.0 "3rd Generation Partnership Project; Technical Specification Group Services and System Aspects; Procedures for the 5G System; Stage 2 (Release 15)," Sep. 17, 2018, 329 pages.

3GPP TS 29.518 V15.1.0 "3rd Generation Partnership Project; Technical Specification Group Core Network and Terminals;5G System; Access and Mobility Management Services; Stage 3 (Release 15)," Sep. 22, 2018, 173 pages.

Huawei, "Notifying Change of Event Subscription Id After Mobility," 3GPP TSG CT4 Meeting #84, C4-183351, KunMing, P.R. China; Apr. 16-20, 2018, 7 pages.

Nokia, et al., "AMF Context Retrieval upon relocation," 3GPP TSG-SA2 Meeting #127, S2-183242, Sanya, China, Apr. 16, 2018-Apr. 20, 2018, 11 pages.

\* cited by examiner

SUBSCRIPTION UPDATE METHOD, DEVICE, AND SYSTEM

CROSS-REFERENCE TO RELATED APPLICATIONS

This application is continuation of International Patent Application No. PCT/CN2019/106166, filed on Sep. 17, 2019, which claims priority to Chinese Patent Application No. 201811161753.5, filed on Sep. 30, 2018, both of which are hereby incorporated by reference in their entireties.

TECHNICAL FIELD

This application relates to the field of communications technologies, and in particular, to a subscription update method, a device, and a system.

BACKGROUND

In an existing group-based event subscription service procedure, after a unified data management (UDM) network element receives an event subscription request for a group of users, if the UDM network element determines that an access and mobility management function (AMF) network element needs to detect a subscribed event, the UDM network element needs to send an event subscription request to all AMF network elements serving the current group member users such that a corresponding AMF network element performs corresponding event monitoring for a registered group member user based on the event subscription request, and further sends a corresponding event notification to the UDM network element after detecting the subscribed event.

When a group member user is migrated from an AMF network element with event subscription performed by the UDM network element to an AMF network element without event subscription performed by the UDM network element, the event subscription needs to be processed such that a network can continue to perform effective event monitoring for the group member user. However, currently there is no related solution.

SUMMARY

Embodiments of this application provide a subscription update method, a device, and a system such that a network can continue to perform effective event monitoring for a group member user when the group member user is migrated.

To achieve the foregoing objective, the following technical solutions are used in the embodiments of this application.

According to a first aspect, a subscription update method is provided. The method includes receiving, by a second mobility management network element, event subscription information of a first terminal from a first mobility management network element, where the event subscription information of the first terminal includes information about a first subscription to a first event, the information about the first subscription includes group subscription identification information, the first terminal belongs to a first user group, and the first event is an event subscribed to by a unified data management network element for the first user group, allocating, by the second mobility management network element, a second subscription correlation identifier if the second mobility management network element has no subscription to the first event, and sending, by the second mobility management network element, a first message to the unified data management network element, where the first message includes the second subscription correlation identifier and the group subscription identification information. In this way, the unified data management network element may determine, based on the group subscription identification information, that the second subscription correlation identifier corresponds to the subscription to the first event, or determine, based on the group subscription identification information, that a second subscription is the subscription to the first event. In other words, after the first terminal in the first user group moves out of the first mobility management network element and reselects the second mobility management network element, related processing may be performed on the subscription to the first event such that the network can still continue to perform effective event monitoring for the first terminal.

In a possible design, the method further includes determining, by the second mobility management network element based on the group subscription identification information, that the second mobility management network element has no subscription to the first event. According to this solution, the second mobility management network element may determine that there is no subscription to the first event.

In a possible design, the information about the first subscription further includes a group identifier, the group identifier is used to identify the first user group, and the method further includes determining, by the second mobility management network element based on the group subscription identification information and the group identifier, that the second mobility management network element has no subscription to the first event. According to this solution, the second mobility management network element may determine that there is no subscription to the first event.

According to a second aspect, a subscription update method is provided. The method includes receiving, by a second mobility management network element, event subscription information of a first terminal from a first mobility management network element, where the event subscription information of the first terminal includes information about a first subscription to a first event, the information about the first subscription includes group subscription identification information, the first terminal belongs to a first user group, and the first event is an event subscribed to by a unified data management network element for the first user group, allocating, by the second mobility management network element, a second subscription correlation identifier if the second mobility management network element has no subscription to the first event, and sending, by the second mobility management network element, a first message to the unified data management network element, where the first message includes the second subscription correlation identifier and the group subscription identification information. In this way, the unified data management network element may determine, based on the group subscription identification information, that the second subscription correlation identifier corresponds to the subscription to the first event, or determine, based on the group subscription identification information, that a second subscription is the subscription to the first event. In other words, after the first terminal in the first user group moves out of the first mobility management network element and reselects the second mobility management network element, related processing may be performed on the subscription to the first event such that the network can still continue to perform effective event monitoring for the first terminal.

In a possible design, the information about the first subscription further includes a group identifier, the group identifier is used to identify the first user group, and the method further includes determining, by the second mobility management network element based on the group identifier, that the second mobility management network element has no subscription to the first event.

With reference to the first aspect or the second aspect, in a possible design, the group subscription identification information includes a group correlation identifier.

With reference to the first aspect or the second aspect, in a possible design, the group subscription identification information includes a notification target address.

With reference to the first aspect or the second aspect, in a possible design, the group subscription identification information includes a notification target address and a group correlation identifier.

With reference to the first aspect or the second aspect, in a possible design, the first message further includes indication information, and the indication information is used to indicate that the second subscription correlation identifier is a newly added subscription correlation identifier corresponding to the first event.

With reference to the first aspect or the second aspect, in a possible design, the allocating, by the second mobility management network element, a second subscription correlation identifier includes creating, by the second mobility management network element, a second subscription based on the information about the first subscription, and allocating the second subscription correlation identifier to the second subscription. In other words, the second subscription in this embodiment of this application is created based on the information about the first subscription.

With reference to the first aspect or the second aspect, in a possible design, the method further includes receiving, by the second mobility management network element, a second message from the unified data management network element, where the second message carries the second subscription correlation identifier, and is used to request to modify or delete the second subscription, and modifying or deleting, by the second mobility management network element, the second subscription based on the second message. According to this solution, the second subscription may be modified or deleted.

With reference to the first aspect or the second aspect, in a possible design, the first event is determined by the unified data management network element based on a second event, and the second event is an event subscribed to by a capability exposure network element for the first user group. In other words, in this embodiment of this application, the event subscribed to by the unified data management network element for the first user group may be triggered by the event subscribed to by the capability exposure network element for the first user group.

According to a third aspect, a subscription update method is provided. The method includes receiving, by a unified data management network element, a first message from a second mobility management network element, where the first message includes group subscription identification information and a second subscription correlation identifier, the group subscription identification information is used to indicate a subscription to a first event, the second subscription correlation identifier is a subscription correlation identifier allocated by the second mobility management network element to the subscription to the first event, and the first event is an event subscribed to by the unified data management network element for the first user group, and determining, by the unified data management network element based on the group subscription identification information, that the second subscription correlation identifier corresponds to the subscription to the first event, or determining that a second subscription is the subscription to the first event. In other words, after the first terminal in the first user group moves out of the first mobility management network element and reselects the second mobility management network element, related processing may be performed on the subscription to the first event such that the network can still continue to perform effective event monitoring for the first terminal.

In a possible design, before the receiving, by a unified data management network element, a first message from a second mobility management network element, the method further includes determining, by the unified data management network element, that the first event needs to be subscribed to for the first user group, and sending, by the unified data management network element, information about the subscription to the first event to one or more mobility management network elements serving a terminal in the first user group, where the information about the subscription to the first event includes the group subscription identification information. In other words, in this embodiment of this application, subscriptions to the first event corresponding to different mobility management network elements may be associated using the group subscription identification information.

In a possible design, the determining, by the unified data management network element, that the first event needs to be subscribed to for the first user group includes receiving, by the unified data management network element, a subscription to a second event from a capability exposure network element, where the second event is an event subscribed to by the capability exposure network element for the first user group, and determining, by the unified data management network element based on the second event, that the first event needs to be subscribed to for the first user group. In other words, in this embodiment of this application, the event subscribed to by the unified data management network element for the first user group may be triggered by the event subscribed to by the capability exposure network element for the first user group.

In a possible design, the method further includes further determining, by the unified data management network element, that the second subscription correlation identifier corresponds to the subscription to the second event, where the second event is an event subscribed to by the capability exposure network element for the first user group. In this way, when the capability exposure network element subsequently modifies or deletes the subscription to the second event, the unified data management network element may modify or delete the second subscription based on the second subscription correlation identifier.

In a possible design, the group subscription identification information includes a group correlation identifier.

In a possible design, the group subscription identification information includes a notification target address.

In a possible design, the group subscription identification information includes a notification target address and a group correlation identifier.

In a possible design, the first message further includes indication information, and the indication information is used to indicate that the second subscription correlation identifier is a newly added subscription correlation identifier corresponding to the first event.

In a possible design, the one or more mobility management network elements include a first mobility management network element, the first mobility management network element corresponds to the first subscription to the first event, and the method further includes determining, by the unified data management network element, that the information about the first subscription needs to be deleted, and deleting, by the unified data management network element, the information about the first subscription. In other words, in this embodiment of this application, the unified data management network element may delete the information about the first subscription after determining that the information about the first subscription needs to be deleted.

In a possible design, the determining, by the unified data management network element, that the information about the first subscription needs to be deleted includes determining, by the unified data management network element, that no terminal in the first user group is registered with the first mobility management network element. According to this solution, the unified data management network element may learn that the information about the first subscription needs to be deleted.

In a possible design, the unified data management network element receives a third message from the first mobility management network element, and the unified data management network element determines, based on the third message, that the information about the first subscription needs to be deleted. According to this solution, the unified data management network element may learn that the information about the first subscription needs to be deleted.

In a possible design, the method further includes receiving, by the unified data management network element, a fourth message from a network exposure function network element, where the fourth message is used to request to modify or delete the subscription to the second event, and the second event is an event subscribed to by the capability exposure network element for the first user group, and sending, by the unified data management network element based on the fourth message, a second message to the one or more mobility management network elements serving the terminal in the first user group, where the second message carries a corresponding subscription correlation identifier, and is used to request to modify or delete the subscription to the first event, the mobility management network element serving the terminal in the first user group includes the second mobility management network element, and a subscription correlation identifier corresponding to the second mobility management network element is the second subscription correlation identifier. In other words, in this embodiment of this application, the network exposure function network element may trigger deletion of the subscription to the first event.

According to a fourth aspect, a subscription update method is provided. The method includes learning, by a unified data management network element, that a first event needs to be subscribed to from a second mobility management network element, where the first event is an event subscribed to by the unified data management network element for a first user group, and sending, by the unified data management network element, a first message to the second mobility management network element, where the first message is used to subscribe to the first event, the first message includes group subscription identification information, the group subscription identification information is used to associate a second subscription with information about a first subscription to the first event, the second subscription is a subscription to the first event corresponding to the second mobility management network element, the information about the first subscription is information in event subscription information of the first terminal obtained by the second mobility management network element from the first mobility management network element, and the first terminal belongs to the first user group, and receiving, by the unified data management network element, a second subscription correlation identifier from the second mobility management network element, where the second subscription correlation identifier is a subscription correlation identifier allocated by the second mobility management network element to the second subscription. According to the solution, when the first terminal in the first user group is migrated, the unified data management network element subscribes to the first event from the mobility management network element to which the first terminal is newly migrated such that a network can still continue to perform effective event monitoring for the first terminal.

In a possible design, the first message further includes indication information, and the indication information is used to indicate that the second mobility management network element does not need to reset the information about the first subscription based on the event subscription request. In this way, the second mobility management network element does not need to reset the information about the first subscription based on the event subscription request.

In a possible design, that the indication information is used to indicate that the second mobility management network element does not need to reset the information about the first subscription based on the event subscription request includes the following. The indication information is used to indicate that the second mobility management network element does not need to reset a quantity of remaining reports in the information about the first subscription based on a maximum quantity of reports in the event subscription request. In this way, the second mobility management network element does not need to reset the quantity of remaining reports in the information about the first subscription based on the maximum quantity of reports in the event subscription request.

In a possible design, the learning, by the unified data management network element, that the first event needs to be subscribed to from the second mobility management network element includes receiving, by the unified data management network element, a second message from the second mobility management network element, where the second message includes the group subscription identification information, and learning, by the unified data management network element based on the group subscription identification information, that the first event needs to be subscribed to from the second mobility management network element. According to the solution, the unified data management network element may learn that the first event needs to be subscribed to from the second mobility management network element.

In a possible design, the second message further includes a group identifier, and the group identifier is used to identify the first user group. The learning, by the unified data management network element based on the group subscription identification information, that the first event needs to be subscribed to from the second mobility management network element includes learning, by the unified data management network element based on the group identifier and the group subscription identification information, that the first event needs to be subscribed to from the second mobility management network element.

In a possible design, the learning, by the unified data management network element, that the first event needs to be subscribed to from the second mobility management network element includes receiving, by the unified data management network element, a third message from the second mobility management network element, where the third message includes an identifier of the first terminal, and learning, by the unified data management network element based on the identifier of the first terminal, that the first event needs to be subscribed to from the second mobility management network element. According to the solution, the unified data management network element may learn that the first event needs to be subscribed to from the second mobility management network element.

In a possible design, the method further includes determining, by the unified data management network element, that the first event needs to be subscribed to for the first user group, and sending, by the unified data management network element, information about the subscription to the first event to one or more mobility management network elements serving a terminal in the first user group, where the information about the subscription to the first event includes the group subscription identification information, the one or more mobility management network elements include the first mobility management network element, and the first mobility management network element corresponds to the first subscription. In other words, in this embodiment of this application, subscriptions to the first event corresponding to different mobility management network elements may be associated using the group subscription identification information.

In a possible design, the determining, by the unified data management network element, that the first event needs to be subscribed to for the first user group includes receiving, by the unified data management network element, a subscription to a second event from a capability exposure network element, and determining, by the unified data management network element based on the second event, that the first event needs to be subscribed to for the first user group. According to this solution, the unified data management network element may learn that the first event needs to be subscribed to for the first user group.

In a possible design, after the receiving, by the unified data management network element, a second subscription correlation identifier from the second mobility management network element, the method further includes further determining, by the unified data management network element, that the second subscription correlation identifier corresponds to the subscription to the second event, where the second event is an event subscribed to by the capability exposure network element for the first user group. In this way, when the capability exposure network element subsequently modifies or deletes the subscription to the second event, the unified data management network element may modify or delete the second subscription based on the second subscription correlation identifier.

In a possible design, the group subscription identification information includes a group correlation identifier.

In a possible design, the group subscription identification information includes a notification target address.

In a possible design, the group subscription identification information includes a notification target address and a group correlation identifier.

In a possible design, the method further includes determining, by the unified data management network element, that the information about the first subscription needs to be deleted, and deleting, by the unified data management network element, the information about the first subscription. In other words, in this embodiment of this application, the unified data management network element may delete the information about the first subscription after determining that the information about the first subscription needs to be deleted.

In a possible design, the determining, by the unified data management network element, that the information about the first subscription needs to be deleted includes determining, by the unified data management network element, that no terminal in the first user group is registered with the first mobility management network element. According to this solution, the unified data management network element may learn that the information about the first subscription needs to be deleted.

In a possible design, the unified data management network element receives a fourth message from the first mobility management network element, and the unified data management network element determines, based on the fourth message, that the information about the first subscription needs to be deleted. According to this solution, the unified data management network element may learn that the information about the first subscription needs to be deleted.

In a possible design, the method further includes receiving, by the unified data management network element, a fifth message from a network exposure function network element, where the fifth message is used to request to modify or delete the subscription to the second event, and the second event is an event subscribed to by the capability exposure network element for the first user group, and sending, by the unified data management network element based on the fifth message, a sixth message to the one or more mobility management network elements serving the terminal in the first user group, where the sixth message carries a corresponding subscription correlation identifier, and is used to request to modify or delete the subscription to the first event, the mobility management network element serving the terminal in the first user group includes the second mobility management network element, and a subscription correlation identifier corresponding to the second mobility management network element is the second subscription correlation identifier. In other words, in this embodiment of this application, the network exposure function network element may trigger deletion of the subscription to the first event.

According to a fifth aspect, a subscription update method is provided. The method includes receiving, by a second mobility management network element, event subscription information of a first terminal from a first mobility management network element, where the event subscription information of the first terminal includes information about a first subscription to a first event, the information about the first subscription includes group subscription identification information, the first terminal belongs to a first user group, and the first event is an event subscribed to by the unified data management network element for the first user group, receiving, by the second mobility management network element, a first message from the unified data management network element, where the first message is used to subscribe to the first event, the first message includes the group subscription identification information, the group subscription identification information is used to associate a second subscription with the information about the first subscription, and the second subscription is a subscription to the first event corresponding to the second mobility management network element, allocating, by the second mobility management network element, a second subscription correlation identifier to the second subscription, and sending, by the second mobility management network element, the second subscription correlation identifier to the unified data management network element. According to the solution, when the first terminal in the first user group is migrated, the unified data management network element subscribes to the first event from the mobility management network element to which the first terminal is newly migrated such that a network can still continue to perform effective event monitoring for the first terminal.

In a possible design, the first message further includes indication information, and the indication information is used to indicate that the second mobility management network element does not need to reset the information about the first subscription based on the event subscription request. In this way, the second mobility management network element does not need to reset the information about the first subscription based on the event subscription request.

In a possible design, that the indication information is used to indicate that the second mobility management network element does not need to reset the information about the first subscription based on the event subscription request includes the following. The indication information is used to indicate that the second mobility management network element does not need to reset a quantity of remaining reports in the information about the first subscription based on a maximum quantity of reports in the event subscription request. In this way, the second mobility management network element does not need to reset the quantity of remaining reports in the information about the first subscription based on the maximum quantity of reports in the event subscription request.

In a possible design, the method further includes determining, by the second mobility management network element, that there is no subscription to the first event, and sending, by the second mobility management network element, a second message to the unified data management network element, where the second message includes the group subscription identification information, and the group subscription identification information is used by the unified data management network element to learn that the first event needs to be subscribed to from the second mobility management network element. According to the solution, the unified data management network element may learn that the first event needs to be subscribed to from the second mobility management network element.

In a possible design, the second message further includes a group identifier, and the group identifier is used to identify the first user group. The group identifier is used by the unified data management network element to learn that the first event needs to be subscribed to from the second mobility management network element.

In a possible design, the method further includes determining, by the second mobility management network element, that there is no subscription to the first event, and sending, by the second mobility management network element, a third message to the unified data management network element, where the third message includes an identifier of the first terminal, and the identifier of the first terminal is used by the unified data management network element to learn that the first event needs to be subscribed to from the second mobility management network element. According to the solution, the unified data management network element may learn that the first event needs to be subscribed to from the second mobility management network element.

In a possible design, the group subscription identification information includes a group correlation identifier.

In a possible design, the group subscription identification information includes a notification target address.

In a possible design, the group subscription identification information includes a notification target address and a group correlation identifier.

In a possible design, the method further includes receiving, by the second mobility management network element, a sixth message from the unified data management network element, where the sixth message carries the second subscription correlation identifier, and is used to request to modify or delete the second subscription, and modifying or deleting, by the second mobility management network element, the second subscription based on the sixth message. According to this solution, the second subscription may be modified or deleted.

In a possible design, the first event is determined by the unified data management network element based on a second event, and the second event is an event subscribed to by a capability exposure network element for the first user group. In other words, in this embodiment of this application, the event subscribed to by the unified data management network element for the first user group may be triggered by the event subscribed to by the capability exposure network element for the first user group.

According to a sixth aspect, a second mobility management network element is provided. The second mobility management network element has a function of implementing the method according to the first aspect, the second aspect, or the fifth aspect. The function may be implemented by hardware, or may be implemented by hardware executing corresponding software. The hardware or the software includes one or more modules corresponding to the function.

According to a seventh aspect, a second mobility management network element is provided, including a processor and a memory. The memory is configured to store a computer executable instruction, and when the second mobility management network element runs, the processor executes the computer executable instruction stored in the memory such that the second mobility management network element performs the subscription update method according to any one of the first aspect, the second aspect, or the fifth aspect.

According to an eighth aspect, a second mobility management network element is provided, including a processor. The processor is configured to, after being coupled to a memory and reading an instruction in the memory, perform, according to the instruction, the subscription update method according to any one of the first aspect, the second aspect, or the fifth aspect.

According to a ninth aspect, a computer readable storage medium is provided. The computer readable storage medium stores an instruction, and when the instruction is run on a computer, the computer is enabled to perform the subscription update method according to any one of the first aspect, the second aspect, or the fifth aspect.

According to a tenth aspect, a computer program product including an instruction is provided. When the computer program product is run on a computer, the computer is enabled to perform the subscription update method according to any one of the first aspect, the second aspect, or the fifth aspect.

According to an eleventh aspect, an apparatus (for example, the apparatus may be a chip system) is provided. The apparatus includes a processor configured to support a second mobility management network element in implementing the function in the first aspect, the second aspect, or the fifth aspect, for example, allocating a second subscription correlation identifier. In a possible design, the apparatus further includes a memory. The memory is configured to store a program instruction and data that are necessary for the second mobility management network element. When the apparatus is a chip system, the apparatus may include a chip, or may include a chip and another discrete component.

For a technical effect brought by any design manner in the sixth aspect to the eleventh aspect, refer to technical effects brought by different design manners in the first aspect, the second aspect, or the fifth aspect. Details are not described herein again.

According to a twelfth aspect, a unified data management network element is provided. The unified data management network element has a function of implementing the method according to the third aspect or the fourth aspect. The function may be implemented by hardware, or may be implemented by hardware executing corresponding software. The hardware or the software includes one or more modules corresponding to the function.

According to a thirteenth aspect, a unified data management network element is provided, including a processor and a memory. The memory is configured to store a computer executable instruction, and when the unified data management network element runs, the processor executes the computer executable instruction stored in the memory such that the unified data management network element performs the subscription update method according to the third aspect or the fourth aspect.

According to a fourteenth aspect, a unified data management network element is provided, including a processor. The processor is configured to, after being coupled to a memory and reading an instruction in the memory, perform, according to the instruction, the subscription update method according to the third aspect or the fourth aspect.

According to a fifteenth aspect, a computer readable storage medium is provided. The computer readable storage medium stores an instruction, and when the instruction is run on a computer, the computer is enabled to perform the subscription update method according to the third aspect or the fourth aspect.

According to a sixteenth aspect, a computer program product including an instruction is provided. When the computer program product is run on a computer, the computer is enabled to perform the subscription update method according to the third aspect or the fourth aspect.

According to a seventeenth aspect, an apparatus (for example, the apparatus may be a chip system) is provided. The apparatus includes a processor configured to support a unified data management network element in implementing the function in the third aspect or the fourth aspect, for example, determining, based on the group subscription identification information, that the second subscription correlation identifier corresponds to the subscription to the first event, or determining that the second subscription is the subscription to the first event. In a possible design, the apparatus further includes a memory. The memory is configured to store a program instruction and data that are necessary for the unified data management network element. When the apparatus is a chip system, the apparatus may include a chip, or may include a chip and another discrete component.

For a technical effect brought by any design manner in the twelfth aspect to the seventeenth aspect, refer to technical effects brought by different design manners in the third aspect or the fourth aspect. Details are not described herein again.

According to an eighteenth aspect, a subscription update system is provided. The subscription update system includes a second mobility management network element and a unified data management network element. The second mobility management network element is configured to perform the steps performed by the second mobility management network element in the first aspect or the second aspect, or the solutions provided in the embodiments of this application. The unified data management network element is configured to perform the steps performed by the unified data management network element in the third aspect or the solutions provided in the embodiments of this application. Alternatively, the second mobility management network element is configured to perform the steps performed by the second mobility management network element in the fifth aspect or the solutions provided in the embodiments of this application. The unified data management network element is configured to perform the steps performed by the unified data management network element in the fourth aspect or the solutions provided in the embodiments of this application.

In a possible design, the subscription update system may further include another device that interacts with the second mobility management network element or the unified data management network element in the solutions provided in the embodiments of this application, for example, the first mobility management network element or the network exposure function network element. This is not specifically limited in this embodiment of this application.

These aspects or other aspects in this application may be clearer and more intelligible in descriptions in the following embodiments.

DESCRIPTION OF EMBODIMENTS

The following describes the technical solutions in the embodiments of this application with reference to the accompanying drawings in the embodiments of this application. In the description of this application, "/" represents an "or" relationship between associated objects unless otherwise specified. For example, A/B may represent A or B. The term "and/or" in this application describes only an association relationship for describing associated objects and represents that three relationships may exist. For example, A and/or B may represent the following three cases. Only A exists, both A and B exist, and only B exists, where A and B may be singular or plural. In addition, in description of this application, "a plurality of" means two or more than two unless otherwise specified. "At least one (one piece) of the following" or a similar expression thereof refers to any combination of these items, including any combination of singular items (pieces) or plural items (pieces). For example, at least one (piece) of a, b, or c may represent a, b, c, a-b, a-c, b-c, or a-b-c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In addition, the subscription update method provided in the embodiments of this application is applicable to a plurality of system architectures. The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1A:
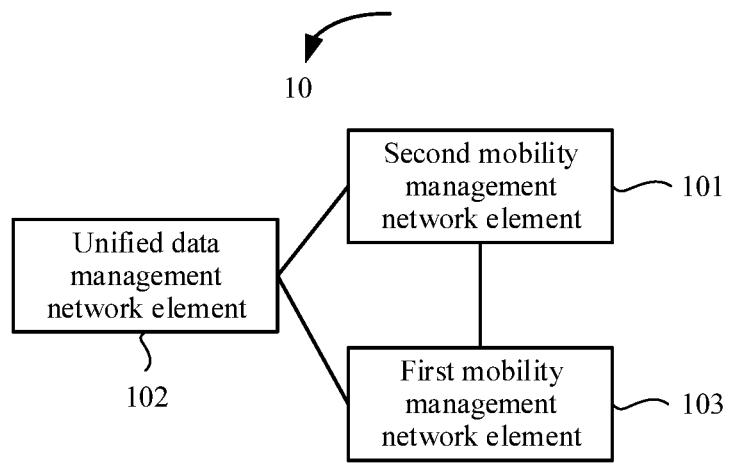
FIG. 1A is a first schematic structural diagram of a subscription update system according to an embodiment of this application.

FIG. 1A shows a subscription update system 10 according to an embodiment of this application. The subscription update system 10 includes a first mobility management network element 103, a second mobility management network element 101, and a unified data management network element 102. The second mobility management network element 101 and the first mobility management network element 103 may directly communicate with each other, or may communicate with each other through forwarding using another device. This is not specifically limited in this embodiment of this application. The second mobility management network element 101 and the unified data management network element 102 may directly communicate with each other, or may communicate with each other through forwarding using another device. This is not specifically limited in this embodiment of this application. The first mobility management network element 103 and the unified data management network element 102 may directly communicate with each other, or may communicate with each other through forwarding using another device. This is not specifically limited in this embodiment of this application.

In a possible implementation, the second mobility management network element 101 is configured to receive event subscription information of a first terminal from the first mobility management network element 103, where the event subscription information of the first terminal includes information about a first subscription to a first event, the information about the first subscription includes group subscription identification information, the first terminal belongs to a first user group, and the first event is an event subscribed to by the unified data management network element 102 for the first user group, the second mobility management network element 101 is further configured to, if the second mobility management network element 101 has no subscription to the first event, or if the second mobility management network element 101 has no subscription for the first user group, allocate a second subscription correlation identifier, and send a first message to the unified data management network element 102, where the first message includes the second subscription correlation identifier and the group subscription identification information, and the unified data management network element 102 is configured to receive the first message from the second mobility management network element 101, and determine, based on the group subscription identification information, that the second subscription correlation identifier corresponds to a subscription to the first event, or determine, based on the group subscription identification information, that the second subscription is a subscription to the first event.

In the subscription update system provided in this embodiment of this application, after the first terminal in the first user group moves out of the first mobility management network element and reselects the second mobility management network element, the second mobility management network element receives the information about the first subscription to the first event from the first mobility management network element. If the second mobility management network element has no subscription to the first event, after allocating the second subscription correlation identifier, the second mobility management network element may send the second subscription correlation identifier and the group subscription identification information included in the information about the first subscription to the unified data management network element such that the unified data management network element may determine, based on the group subscription identification information, that the second subscription correlation identifier corresponds to the subscription to the first event, or determine, based on the group subscription identification information, that the second subscription is the subscription to the first event. In other words, according to the subscription update system provided in this embodiment of this application, when the first terminal in the first user group is migrated, related processing may be performed on the subscription to the first event such that a network can still continue to perform effective event monitoring for the first terminal.

In another possible implementation, the second mobility management network element 101 is configured to receive event subscription information of a first terminal from the first mobility management network element 103, where the event subscription information of the first terminal includes information about a first subscription to a first event, the information about the first subscription includes group subscription identification information, the first terminal belongs to a first user group, and the first event is an event subscribed to by the unified data management network element 102 for the first user group, the second mobility management network element 101 is further configured to, if the second mobility management network element 101 has no subscription for the first user group, allocate a second subscription correlation identifier, and send a first message to the unified data management network element 102, where the first message includes the second subscription correlation identifier and the group subscription identification information, and the unified data management network element 102 is configured to receive the first message from the second mobility management network element 101, and determine, based on the group subscription identification information, that the second subscription correlation identifier corresponds to a subscription to the first event, or determine, based on the group subscription identification information, that the second subscription is a subscription to the first event.

In the subscription update system provided in this embodiment of this application, after the first terminal in the first user group moves out of the first mobility management network element and reselects the second mobility management network element, the second mobility management network element receives the information about the first subscription to the first event from the first mobility management network element. If the second mobility management network element has no subscription for the first user group, after allocating the second subscription correlation identifier, the second mobility management network element may send the second subscription correlation identifier and the group subscription identification information included in the information about the first subscription to the unified data management network element such that the unified data management network element may determine, based on the group subscription identification information, that the second subscription correlation identifier corresponds to the subscription to the first event, or determine, based on the group subscription identification information, that the second subscription is the subscription to the first event. In other words, according to the subscription update system provided in this embodiment of this application, when the first terminal in the first user group is migrated, related processing may be performed on the subscription to the first event such that a network can still continue to perform effective event monitoring for the first terminal.

In still another possible implementation, the second mobility management network element 101 is configured to receive event subscription information of a first terminal from the first mobility management network element 103, where the event subscription information of the first terminal includes information about a first subscription to a first event, the information about the first subscription includes group subscription identification information, the first terminal belongs to a first user group, and the first event is an event subscribed to by the unified data management network element 102 for the first user group, the unified data management network element 102 is configured to learn that the first event needs to be subscribed to from the second mobility management network element 101, the unified data management network element 102 is further configured to send a first message to the second mobility management network element 101, where the first message is used to subscribe to the first event, and the first message includes the group subscription identification information, the second mobility management network element 101 is further configured to receive the first message from the unified data management network element 102, and associate a second subscription with the information about the first subscription based on the group subscription identification information, where the second subscription is a subscription to the first event corresponding to the second mobility management network element 101, the second mobility management network element 101 is further configured to allocate a second subscription correlation identifier to the second subscription, and send the second subscription correlation identifier to the unified data management network element 102, and the unified data management network element 102 is further configured to receive the second subscription correlation identifier from the second mobility management network element 101.

In the subscription update system provided in this embodiment of this application, after the first terminal in the first user group moves out of the first mobility management network element and reselects the second mobility management network element, the second mobility management network element receives the information about the first subscription to the first event from the first mobility management network element. If the unified data management network element learns that the first event needs to be subscribed to from the second mobility management network element, the unified data management network element sends the first message to the second mobility management network element, where the first message includes the group subscription identification information, and is used to subscribe to the first event. After receiving the first message from the unified data management network element, the second mobility management network element may associate the second subscription with the information about the first subscription based on the group subscription identification information. In addition, the second mobility management network element may allocate the second subscription correlation identifier to the second subscription, and send the second subscription correlation identifier to the unified data management network element. In other words, according to the subscription update system provided in this embodiment of this application, when the first terminal in the first user group is migrated, the unified data management network element subscribes to the first event from the mobility management network element to which the first terminal is newly migrated such that a network can still continue to perform effective event monitoring for the first terminal.

Optionally, in addition to the foregoing functions, the first mobility management network element 103 or the second mobility management network element 101 may be further configured for mobility management in a mobile network, for example, user location update, user registration with a network, and user handover. In a 5th generation (5G) communications system, a network element or an entity corresponding to the first mobility management network element 103 may be an AMF 1 network element in a 5G network architecture, a network element or an entity corresponding to the second mobility management network element 101 may be an AMF 3 network element in the 5G network architecture, Namf is a service-based interface provided by the AMF 1 network element or the AMF 3 network element, and the AMF 1 network element or the AMF 3 network element may communicate with another network function through Namf. In a future communications system such as the 6th generation communications (6G) communications system, the first mobility management network element 103 may still be an AMF 1 network element, and the second mobility management network element 101 may still be an AMF 3 network element, or the first mobility management network element 103 or the second mobility management network element 101 has another name. This is not limited in this embodiment of this application.

Optionally, in addition to the foregoing functions, the unified data management network element 102 may be further configured to process a user identifier, access authentication, registration, mobility management, or the like. In the 5G communications system, the data management network element may be a UDM network element, Nudm is a service-based interface provided by the UDM network element, and the UDM network element may communicate with another network function through Nudm. In the future communications system such as the 6G communications system, the data management network element 102 may still be a UDM network element, or the data management network element 102 has another name. This is not limited in this embodiment of this application.

Optionally, the group subscription identification information in the foregoing embodiment of this application is used to instruct to subscribe to the first event, and may include a group correlation identifier 1 (group_correlation_ID1), or include a notification target address 1 (notification_target_address1), or include a notification target address 1 (notification_target_address1) and a notification correlation identifier 1 (Notification_Correlation_ID1), or the like. This is not specifically limited in this embodiment of this application.

Figure 1B:
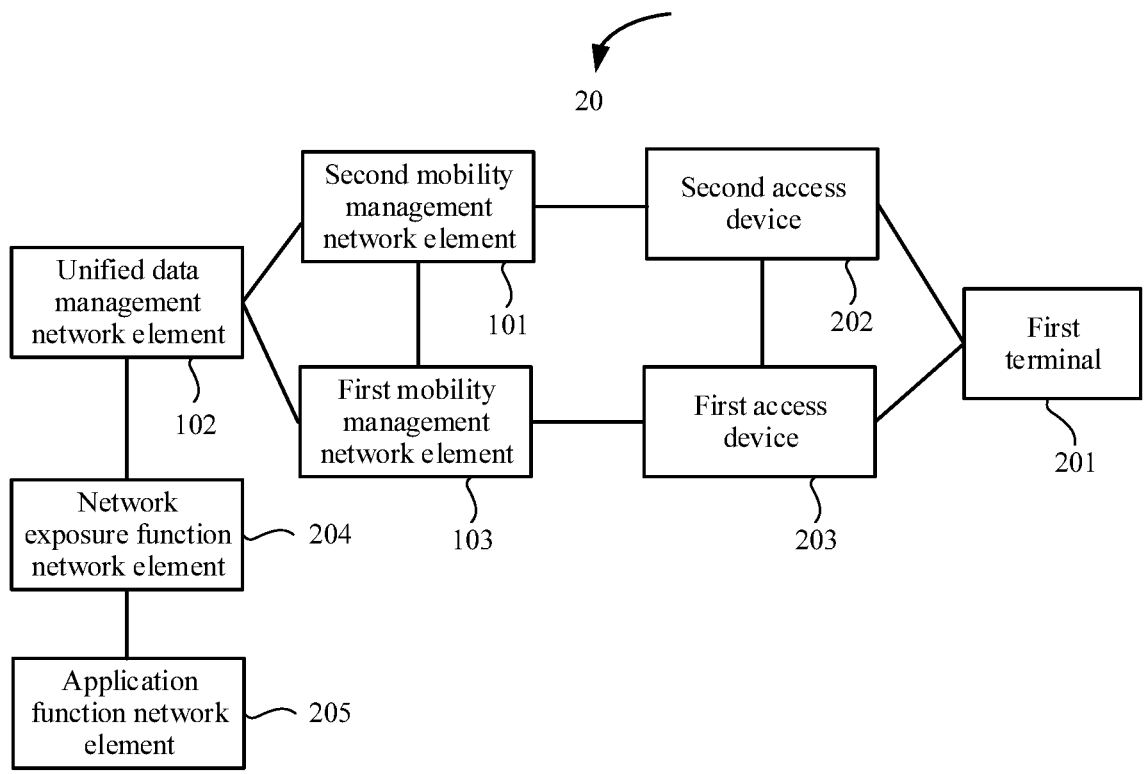
FIG. 1B is a second schematic structural diagram of a subscription update system according to an embodiment of this application.

FIG. 1B shows another possible subscription update system 20 to which an embodiment of this application is applicable. In addition to the first mobility management network element 103, the second mobility management network element 101, and the unified data management network element 102 in FIG. 1A, the subscription update system 20 may further include a first terminal 201 in a first user group, a first access device 202, a second access device 203, a network exposure function network element 204, an application function network element 205, and the like. As shown in FIG. 1B, before the first terminal moves out of the first mobility management network element 103 and reselects the second mobility management network element 101, the first terminal 201 accesses a network using the first access device 202. After the first terminal moves out of the first mobility management network element 103 and reselects the second mobility management network element 101, the first terminal 201 accesses the network using the second access device 203.

The first terminal device 201 is a device that has a wireless transceiver function, and may be deployed on land, including indoor, outdoor, handheld, or in-vehicle deployment, may be deployed on water (for example, on a steamship), or may be deployed in the air (for example, on an airplane, a balloon, or a satellite). The first terminal device 201 may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, and the like.

The first access device 202 or the second access device 203 is a device that provides a wireless communication function for the first terminal. For example, the first access device 202 or the second access device 203 includes but is not limited to a next generation base station such as a gnodeB (gNB) in the 5G (for example, the first access device 202 is a gNB 1, and the second access device 203 is a gNB 3), an evolved NodeB (eNB) (for example, the first access device 202 is an eNB 1, and the second access device 203 is an eNB 3), a radio network controller (RNC) (for example, the first access device 202 is an RNC 1, and the second access device 203 is an RNC 3), a NodeB (NB) (for example, the first access device 202 is an NB 1, and the second access device 203 is an NB 3), a base station controller (BSC) (for example, the first access device 202 is a BSC 1, and the second access device 203 is a BSC 3), a base transceiver station (BTS) (for example, the first access device 202 is a BTS 1, and the second access device 203 is a BTS 3), a home NodeB (HNB) (for example, the first access device 202 is an HNB 1, and the second access device 203 is an HNB 3), a baseband unit (BBU) (for example, the first access device 202 is a BBU 1, and the second access device 203 is a BBU 3), a transmission reception point (TRP) (for example, the first access device 202 is a TRP 1, and the second access device 203 is a TRP 3), a transmitting point (TP) (for example, the first access device 202 is a TP 1, and the second access device 203 is a TP 3), and a mobile switching center (for example, the first access device 202 is a mobile switching center 1, and the second access device 203 is a mobile switching center 3).

The network exposure function 204 mainly provides a service such that a 3rd Generation Partnership Project (3GPP) network can securely provide a network service capability for a third-party service provider, that is, the application function network element 205. In the 5G communications system, the network exposure function 204 may be a network exposure function (NEF) network element, Nnef is a service-based interface provided by the NEF network element, and the NEF network element may communicate with another network function through Nnef. In a future communications system such as the 6G communications system, the network exposure function 204 may still be an NEF network element, or has another name. This is not limited in this embodiment of this application.

The application function network element 205 is mainly configured to provide application layer information for the 3GPP network. In the 5G communications system, the application function network element 205 may be an application function (AF) network element, Naf is a service-based interface provided by the AF network element, and the AF network element may communicate with another network function through Naf. In a future communications system such as the 6G communications system, the application function network element 205 may still be an AF network element, or has another name. This is not limited in this embodiment of this application. For example, the AF network element may include a service capability server (SCS) or an application server (AS).

Figure 2:
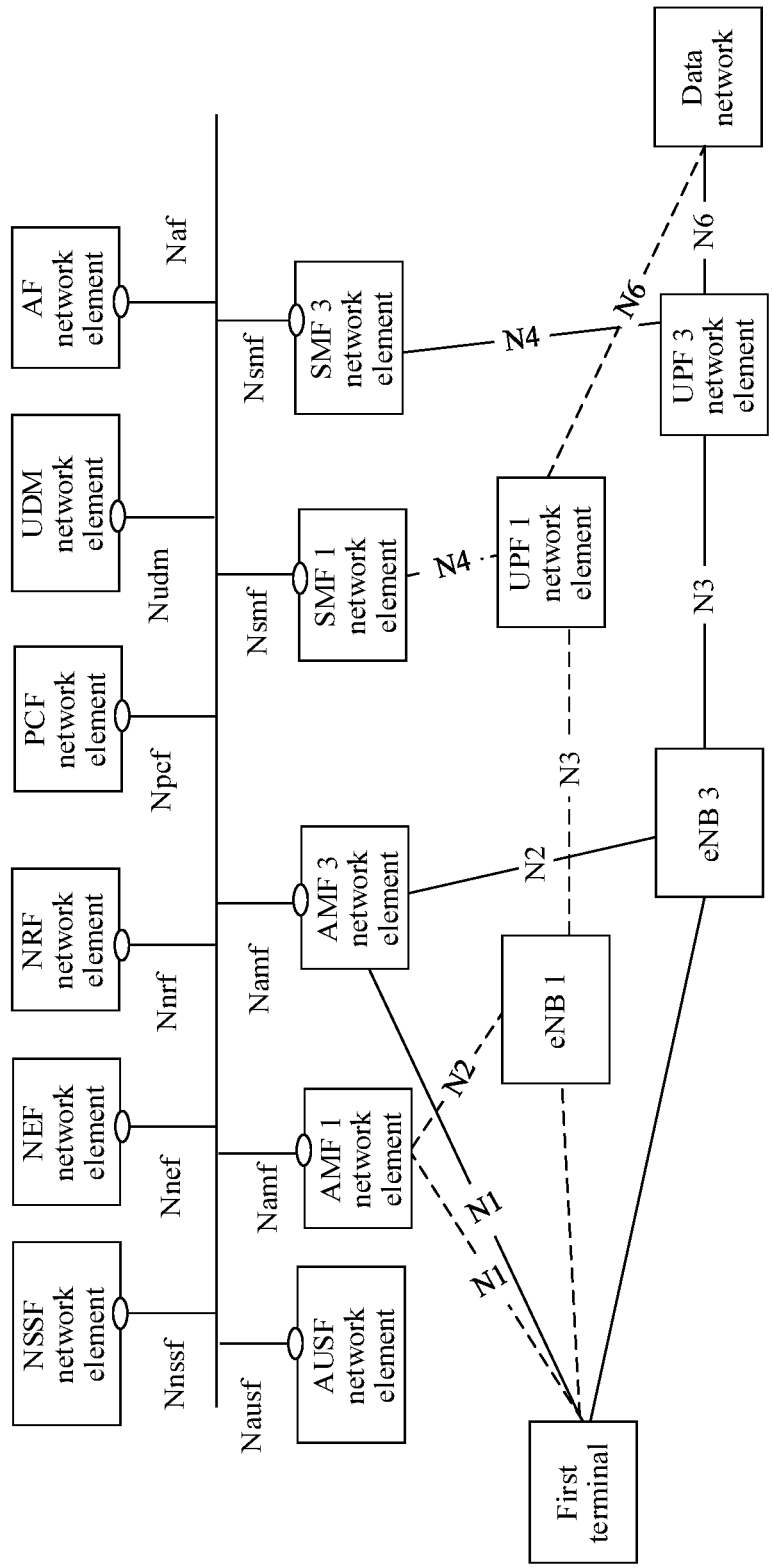
FIG. 2 is a schematic diagram of application of a subscription update system in a 5G network according to an embodiment of this application.

In addition, using the 5G communications system as an example, FIG. 2 shows a specific possible network architecture to which an embodiment of this application is applicable. The network architecture includes the foregoing first terminal, the eNB 1, the eNB 3, the AMF 1 network element, the AMF 3 network element, the UDM network element, the NEF network element, and the AF network element. In addition, the network architecture may further include a session management function (SMF) 1 network element, an SMF 3 network element, a user plane function (UPF) 1 network element, a UPF 3 network element, an authentication server function (AUSF) network element, a network slice selection function (NSSF) network element, a network repository function (NRF) network element, a policy control function (PCF) network element, or the like. This is not specifically limited in this embodiment of this application. In FIG. 2, an N1 interface is a reference point between the first terminal and the AMF 1 network element or the AMF 3 network element. An N2 interface is a reference point between the eNB 1 and the AMF 1 network element, or the N2 interface is a reference point between the eNB 3 and the AMF 3 network element, and the N2 interface is used for sending a non-access stratum (NAS) message, a next generation application protocol (NGAP) message, and the like. An N3 interface is a reference point between the eNB 1 and the UPF 1 network element, or the N3 interface is a reference point between the eNB 3 and the UPF 3 network element, and the N3 interface is used for transmitting user plane data and the like. An N4 interface is a reference point between the SMF 1 and the UPF 1, or the N4 interface is a reference point between the SMF 3 and the UPF 3, and the N4 interface is used for transmitting information such as tunnel identification information of an N3 connection, data buffering indication information, and a downlink data notification message. An N6 interface is a reference point between the UPF 1 network element and a data network (DN), or the N6 interface is a reference point between the UPF 3 network element and the DN, and the N6 interface is used for transmitting user plane data and the like.

In addition, control plane network elements such as the AUSF network element, the AMF network element, the SMF network element, the NSSF network element, the NEF network element, the NRF network element, the PCF network element, the UDM network element, or the AF network element shown in FIG. 2 may use a service-oriented interface for interaction. For example, a service-oriented interface provided by the AUSF network element for external connection may be Nausf, a service-oriented interface provided by the AMF network element for external connection may be Namf, a service-oriented interface provided by the SMF network element for external connection may be Nsmf, a service-oriented interface provided by the NSSG network element for external connection may be Nnssf, a service-oriented interface provided by the NEF network element for external connection may be Nnef, a service-oriented interface provided by the NRF network element for external connection may be Nnrf, a service-oriented interface provided by the PCF network element for external connection may be Npcf, a service-oriented interface provided by the UDM network element for external connection may be Nudm, and a service-oriented interface provided by the AF network element for external connection may be Naf. For related descriptions, refer to a diagram of a 5G system architecture in the 23501 standard. Details are not described herein.

It may be understood that the foregoing network elements or functions may be network elements in a hardware device, software functions running on dedicated hardware, or virtualized functions instantiated on a platform (for example, a cloud platform). One or more services may be obtained through division based on the foregoing network elements or functions. Further, a service independent of a network function may exist. In this application, an instance of the foregoing function, an instance of a service included in the foregoing function, or a service instance independent of the network function may be referred to as a service instance.

Figure 3:
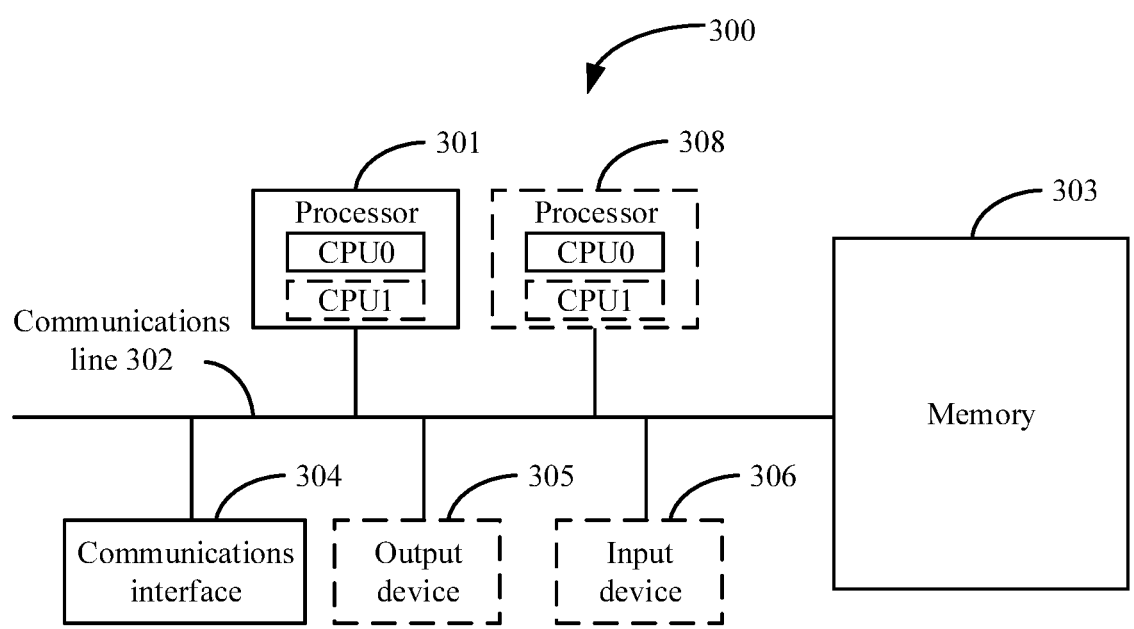
FIG. 3 is a schematic diagram of a hardware structure of a communications device according to an embodiment of this application.

For example, the foregoing network elements or functions may be implemented using a communications device in FIG. 3. FIG. 3 is a schematic diagram of a hardware structure of a communications device according to an embodiment of this application. The communications device 300 includes a processor 301, a communications line 302, a memory 303, and at least one communications interface (FIG. 3 is described merely using an example in which the communications device 300 includes a communications interface 304).

The processor 301 may be a general-purpose central processing unit (CPU), a microprocessor, an application-specific integrated circuit (ASIC), or one or more integrated circuits configured to control program execution of the solutions in this application.

The communications line 302 may include a path transmitting information between the foregoing components.

The communications interface 304, which uses any apparatus such as a transceiver, is configured to communicate with another device or a communications network, such as Ethernet, a radio access network (RAN), or a wireless local area network (WLAN).

The memory 303 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a BLU-RAY optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor using the communications line 302. The memory may alternatively be integrated with the processor.

The memory 303 is configured to store a computer executable instruction for executing the solutions of this application, and the processor 301 controls the execution. The processor 301 is configured to execute the computer executable instruction stored in the memory 303 in order to implement a subscription update method provided in the following embodiments of this application.

Optionally, the computer executable instruction in this embodiment of this application may also be referred to as application program code. This is not specifically limited in this embodiment of the application.

During specific implementation, in one embodiment, the processor 301 may include one or more CPUs, for example, a CPU 0 and a CPU 1 in FIG. 3.

During specific implementation, in an embodiment, the communications device 300 may include a plurality of processors, such as a processor 301 and a processor 308 in FIG. 3. Each of the processors may be a single-core (single-CPU) processor, or may be a multi-core (multi-CPU) processor. The processor herein may be one or more devices, circuits, and/or processing cores configured to process data (for example, a computer program instruction).

During specific implementation, in one embodiment, the communications device 300 may further include an output device 305 and an input device 306. The output device 305 communicates with the processor 301, and may display information in a plurality of manners. For example, the output device 305 may be a liquid-crystal display (LCD), a light-emitting diode (LED) display device, a cathode-ray tube (CRT) display device, or a projector. The input device 306 communicates with the processor 301, and may receive an input from a user in a plurality of manners. For example, the input device 306 may be a mouse cursor, a keyboard, a touchscreen device, or a sensing device.

The communications device 300 may be a general-purpose device or a dedicated device. During specific implementation, the communications device 300 may be a desktop computer, a portable computer, a network server, a personal digital assistant (PDA), a mobile phone, a tablet computer, a wireless terminal device, an embedded device, or a device with a structure similar to that in FIG. 3. A type of the communications device 300 is not limited in this embodiment of this application.

The following describes in detail a subscription update method provided in the embodiments of this application with reference to FIG. 1A to FIG. 3.

It should be noted that the embodiments of this application are not limited to the 5G network architecture shown in FIG. 2, and may be further applied to another future communications system, for example, a 6G network architecture. In addition, in the embodiments of this application, names of the foregoing used network elements may be changed while functions of the network elements may remain the same in a future communications system.

Figure 4:
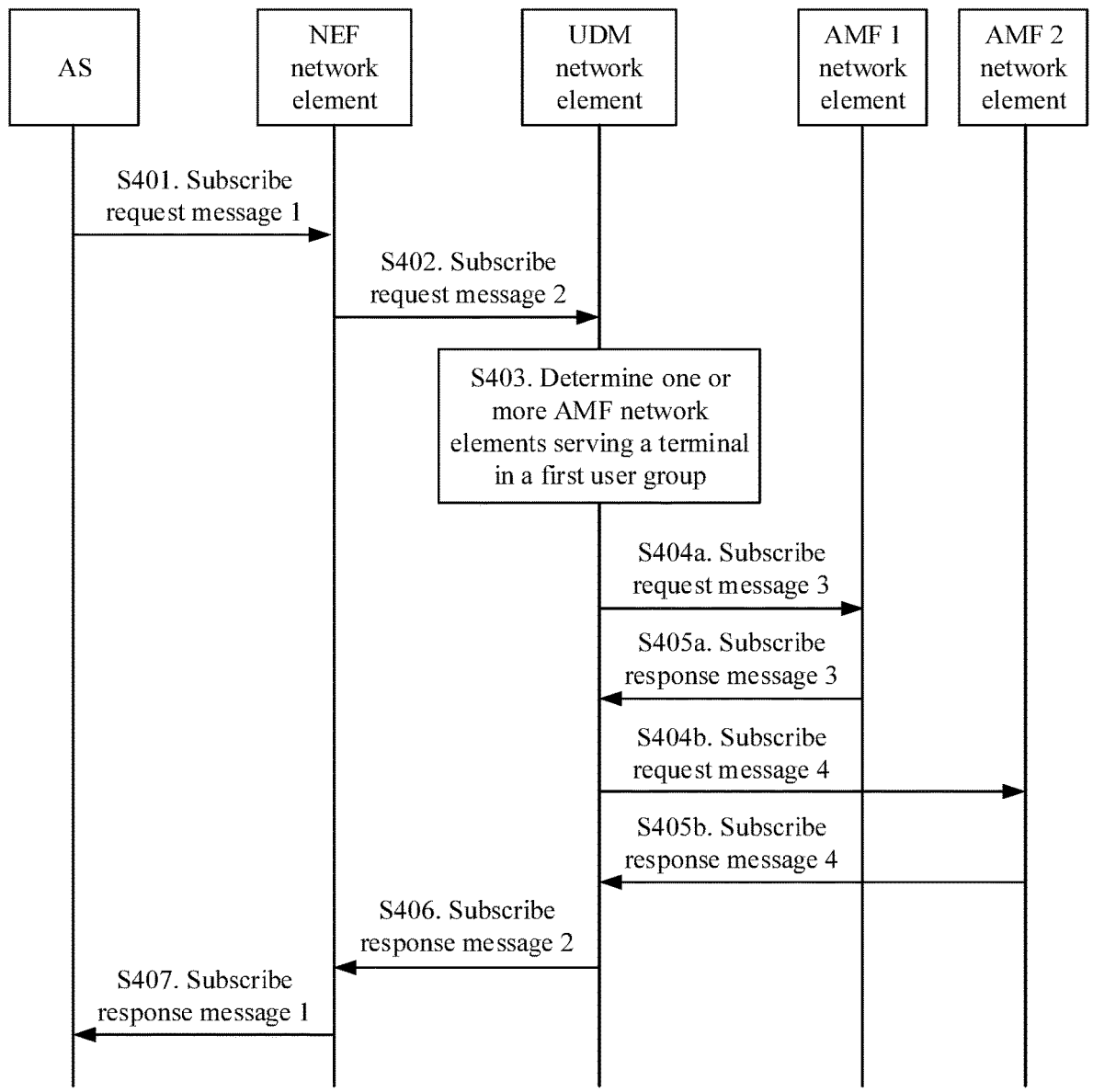
FIG. 4 is a first schematic flowchart of a subscription update method according to an embodiment of this application.

First, for example, the subscription update system shown in FIG. 1A or FIG. 1B is applied to the 5G network shown in FIG. 2, and the AF network element is an AS. FIG. 4 shows a subscription update method according to an embodiment of this application. The subscription update method includes the following steps S401 to S407.

S401. The AS sends a message 1 to an NEF network element such that the NEF network element receives the message 1 from the NEF network element, where the message 1 includes an event identifier (event ID(s)) corresponding to a third event, an external group identifier (external group ID) corresponding to the third event, and an event notification endpoint 3 (event notification endpoint3) and event reporting information 3 (event reporting information3) corresponding to the third event.

Optionally, the third event in this embodiment of this application may be one or more events, for example, an event 1, an event 2, and an event 3. This is not specifically limited in this embodiment of this application. If the third event includes a plurality of events, the plurality of events corresponds to a same external group identifier. This is only described herein, and details are not described in the following again.

Optionally, in this embodiment of this application, the external group identifier is used to identify a first user group, and the first user group includes one or more terminals. This is not specifically limited in this embodiment of this application.

Optionally, in this embodiment of this application, the event notification endpoint 3 includes a notification target address 3 (notification target address3). Optionally, the event notification endpoint 3 may further include a notification correlation identifier 3 (notification correlation ID3). This is not specifically limited in this embodiment of this application. In this embodiment of this application, if a value of the notification target address 3 can uniquely identify a subscription notification corresponding to the third event, the event notification endpoint 3 may not include the notification correlation identifier 3. If a value of the notification target address 3 cannot uniquely identify a subscription notification corresponding to the third event, the notification target address 3 and the notification correlation identifier 3 are needed to uniquely identify the subscription notification corresponding to the third event. This is only described herein, and details are not described in the following again.

Optionally, the event reporting information 3 in this embodiment of this application may include an event reporting mode 3 (event reporting mode3), a maximum quantity 3 of reports (maximum number3 of reports), maximum duration 3 of reporting (maximum duration3 of reporting), an immediate reporting flag 3 (immediate reporting flag3), and the like that correspond to the third event. This is not specifically limited in this embodiment of this application.

For example, as shown in FIG. 4, the message 1 in this embodiment of this application may be a subscribe request (subscribe request) message 1. This is not specifically limited in this embodiment of this application.

S402. The NEF network element sends a message 2 to a UDM network element such that the UDM network element receives the message 2 from the NEF network element, where the message 2 includes an event identifier corresponding to a second event, an internal group identifier (internal group ID) corresponding to the second event, and an event notification endpoint 2 and event reporting information 2 corresponding to the second event.

Optionally, in this embodiment of this application, the internal group identifier in the message 2 is obtained by the NEF network element through mapping based on the external group identifier in the message 1, and is used to identify the first user group. This is only described herein, and this is not specifically limited in this embodiment of this application.

Optionally, in this embodiment of this application, the message 2 may alternatively include the external group identifier instead of the internal group identifier. In this case, mapping from the external group identifier to the internal group identifier may be performed by the UDM network element. The internal group identifier is used to identify the first user group. This is only described herein, and this is not specifically limited in this embodiment of this application.

Optionally, the second event in this embodiment of this application is determined based on the third event in step S401. For example, the second event may be the same as the third event, or may be one or more events in the third event. This is not specifically limited in this embodiment of this application. For example, when the third event includes the event 1, the event 2, and the event 3, the second event may include one or more of the event 1, the event 2, and the event 3. For example, the second event may include the event 1 and the event 2. If the second event includes a plurality of events, the plurality of events corresponds to a same internal group identifier. This is only described herein, and details are not described in the following again.

Optionally, in this embodiment of this application, the event notification endpoint 2 includes a notification target address 2. Optionally, the event notification endpoint 2 may further include a notification correlation identifier 2. This is not specifically limited in this embodiment of this application. In this embodiment of this application, if a value of the notification target address 2 can uniquely identify a subscription notification corresponding to the second event, the event notification endpoint 2 may not include the notification correlation identifier 2. If a value of the notification target address 2 cannot uniquely identify a subscription notification corresponding to the second event, the notification target address 2 and the notification correlation identifier 2 are needed to uniquely identify the subscription notification corresponding to the second event. This is only described herein, and details are not described in the following again.

Optionally, the event reporting information 2 in this embodiment of this application may include an event reporting mode 2, a maximum quantity 2 of reports, maximum duration 2 of reporting, an immediate reporting flag 2, and the like that correspond to the second event. This is not specifically limited in this embodiment of this application.

For example, as shown in FIG. 4, the message 2 in this embodiment of this application may be a subscribe request message 2. This is not specifically limited in this embodiment of this application.

S403. The UDM network element determines the corresponding first user group based on the internal group identifier in the message 2, determines, based on the event identifier corresponding to the second event in the message 2, an event that needs to be detected by an AMF network element (or determines that a first event needs to be subscribed to for the first user group), and further determines one or more AMF network elements serving the terminal in the first user group.

It should be noted that in this embodiment of this application, the one or more AMF network elements serving the terminal in the first user group refer to an AMF network element with which the terminal in the first user group is registered. For example, a first terminal in the first user group is registered with an AMF 1 network element, and a second terminal in the first user group is registered with an AMF 2 network element. In this case, the one or more AMF network elements serving the terminal in the first user group include the AMF 1 network element and the AMF 2 network element.

It may be understood that in this embodiment of this application, the first user group includes one or more terminals. In the following embodiments of this application, that the one or more terminals in the first user group include the first terminal and the second terminal, the first terminal is registered with the AMF 1 network element, and the second terminal is registered with the AMF 2 network element is merely used as an example for description. This is only described herein, and details are not described in the following again.

S404a. The UDM network element sends a message 3 to the AMF 1 network element such that the AMF 1 network element receives the message 3 from the UDM network element, where the message 3 includes an event identifier corresponding to the first event, an internal group identifier corresponding to the first event, an event notification endpoint 11 and event reporting information corresponding to the first event, and the event notification endpoint 2 corresponding to the second event that is included in the message 2.

In addition, the message 3 may further include a group correlation identifier 1 (group_correlation_ID1), and the group correlation identifier 1 is used to indicate a subscription to the first event. This is not specifically limited in this embodiment of this application.

Optionally, the first event in this embodiment of this application is determined based on the second event in step S402. For example, the first event may be the same as the second event, or may be one or more events in the second event. This is not specifically limited in this embodiment of this application. For example, when the second event includes the event 1 and the event 2, the first event may include one or more of the event 1 and the event 2. For example, the first event may include the event 1. If the first event includes a plurality of events, the plurality of events corresponds to a same internal group identifier. This is only described herein, and details are not described in the following again. In addition, in this embodiment of this application, the internal group identifier corresponding to the first event is the same as the internal group identifier corresponding to the second event. In other words, both the first event and the second event are events subscribed to for the first user group. This is only described herein, and details are not described in the following again.

Optionally, in this embodiment of this application, the event notification endpoint 11 includes a notification target address 11. Optionally, the event notification endpoint 11 may further include a notification correlation identifier 2. This is not specifically limited in this embodiment of this application. In this embodiment of this application, if a value of the notification target address 11 can uniquely identify a subscription notification corresponding to a first subscription, the event notification endpoint 11 may not include the notification correlation identifier 11. If a value of the notification target address 11 cannot uniquely identify a subscription notification corresponding to a first subscription, the notification target address 11 and the notification correlation identifier 11 are needed to uniquely identify the subscription notification corresponding to the first subscription. This is only described herein, and details are not described in the following again.

It should be noted that in this embodiment of this application, the first subscription is a subscription to the first event corresponding to the AMF 1 network element, a subsequent third subscription is a subscription to the first event corresponding to the AMF 2 network element, and a subsequent second subscription is a subscription to the first event corresponding to the AMF 3 network element. This is only described herein, and details are not described in the following again.

For example, the event reporting information in this embodiment of this application may include an event reporting mode, a maximum quantity of reports, maximum duration of reporting, an immediate reporting flag, and the like that correspond to the first event. This is not specifically limited in this embodiment of this application.

For example, as shown in FIG. 4, the message 3 in this embodiment of this application may be a subscribe request message 3. This is not specifically limited in this embodiment of this application.

In this embodiment of this application, after receiving the message 3, the AMF 1 network element may store information about the first subscription corresponding to the first event, for example, the event identifier corresponding to the first event, the internal group identifier corresponding to the first event, the event notification endpoint 11 corresponding to the first event, the event notification endpoint 2 corresponding to the second event, and the group correlation identifier 1. Optionally, the information about the first subscription corresponding to the first event may further include the event reporting information. In addition, the AMF 1 network element allocates a first subscription correlation identifier (subscription_correlation_ID1) to the first event, and stores the first subscription correlation identifier in the information about the first subscription. The first subscription correlation identifier is used by the UDM network element to subsequently modify or delete the first subscription. For details, refer to an existing implementation. Details are not described herein.

In addition, in this embodiment of this application, after receiving the message 3, the AMF 1 network element may further determine, based on the internal group identifier in the message 3, a terminal that is in the first user group and that is registered with the AMF 1 network element, and then may perform, based on the information about the first subscription, event monitoring for the terminal that is in the first user group and that is registered with the AMF 1 network element, for example, perform event monitoring for the first terminal in the first user group. This is not specifically limited in this embodiment of this application.

S405a. The AMF 1 network element sends a message 4 to the UDM network element such that the UDM network element receives the message 4 from the AMF 1 network element, where the message 4 includes the first subscription correlation identifier allocated by the AMF 1 network element to the first event.

In this way, after receiving the message 4, the UDM network element may store the first subscription correlation identifier. The first subscription correlation identifier is used by the UDM network element to subsequently modify or delete the subscription to the first event.

For example, as shown in FIG. 4, the message 4 in this embodiment of this application may be a subscribe response message 3. This is not specifically limited in this embodiment of this application.

S404b. The UDM network element sends a message 5 to the AMF 2 network element such that the AMF 2 network element receives the message 5 from the UDM network element, where the message 5 includes the event identifier corresponding to the first event, the internal group identifier corresponding to the first event, an event notification endpoint 12 and the event reporting information corresponding to the first event, and the event notification endpoint 2 corresponding to the second event that is included in the message 2.

In addition, the message 5 may further include the group correlation identifier 1, and the group correlation identifier 1 is used to indicate a subscription to the first event. This is not specifically limited in this embodiment of this application.

For related descriptions of the first event and the internal group identifier corresponding to the first event, refer to the foregoing step S404a. Details are not described herein again.

Optionally, in this embodiment of this application, the event notification endpoint 12 includes a notification target address 12. Optionally, the event notification endpoint 12 may further include a notification correlation identifier 12. This is not specifically limited in this embodiment of this application. In this embodiment of this application, if a value of the notification target address 12 can uniquely identify a subscription notification corresponding to the third subscription, the event notification endpoint 12 may not include the notification correlation identifier 12. If a value of the notification target address 12 cannot uniquely identify a subscription notification corresponding to the third subscription, the notification target address 12 and the notification correlation identifier 12 are needed to uniquely identify the subscription notification corresponding to the third subscription. This is only described herein, and details are not described in the following again.

For related descriptions of the event reporting information corresponding to the first event, refer to step S404a. Details are not described herein again.

For example, as shown in FIG. 4, the message 5 in this embodiment of this application may be a subscribe request message 4. This is not specifically limited in this embodiment of this application.

In this embodiment of this application, after receiving the message 5, the AMF 2 network element may store information about the third subscription corresponding to the first event, for example, the event identifier corresponding to the first event, the internal group identifier corresponding to the first event, the event notification endpoint 12 and the event reporting information corresponding to the first event, the event notification endpoint 2 corresponding to the second event, and the group correlation identifier 1. In addition, the AMF 2 network element allocates a third subscription correlation identifier (subscription_correlation_ID3) to the first event, and stores the third subscription correlation identifier in the information about the third subscription. The third subscription correlation identifier is used by the UDM network element to subsequently modify or delete the third subscription. For details, refer to an existing implementation. Details are not described herein.

In addition, in this embodiment of this application, after receiving the message 5, the AMF 2 network element may further determine, based on the internal group identifier in the message 5, a terminal that is in the first user group and that is registered with the AMF 2 network element, and then may perform, based on the information about the third subscription, event monitoring for the terminal that is in the first user group and that is registered with the AMF 2 network element, for example, perform event monitoring for the second terminal in the first user group. This is not specifically limited in this embodiment of this application.

S405b. The AMF 2 network element sends a message 6 to the UDM network element such that the UDM network element receives the message 6 from the AMF 2 network element, where the message 6 includes the third subscription correlation identifier allocated by the AMF 2 network element to the first event.

In this way, after receiving the message 6, the UDM network element may store the third subscription correlation identifier. The third subscription correlation identifier is used by the UDM network element to subsequently modify or delete the subscription to the first event. For details, refer to the existing implementation. Details are not described herein.

For example, as shown in FIG. 4, the message 6 in this embodiment of this application may be a subscribe response message 4. This is not specifically limited in this embodiment of this application.

In other words, in this embodiment of this application, information about m subscriptions for the first event all includes the group correlation identifier 1, the m subscriptions are subscriptions for the first event respectively corresponding to m AMF network elements serving the terminals in the first user group, and m is a positive integer. For example, both the information about the first subscription and the information about the third subscription include the group correlation identifier 1. This is only described herein, and details are not described in the following again.

It should be noted that in this embodiment of this application, step S404a and step S404b are not performed in a necessary sequence. Step S404a may be performed before step S404b, step S404b may be performed before step S404a, or step S404a and step S404b may be simultaneously performed. This is not specifically limited in this embodiment of this application.

Similarly, in this embodiment of this application, step S405a and step S405b are not performed in a necessary sequence. Step S405a is performed after step S404a, and step S405b is performed after step S404b.

S406. After storing information about a fourth subscription corresponding to the second event, and allocating a fourth subscription correlation identifier (subscription_correlation_ID4) to the second event, the UDM network element sends a message 7 to the NEF network element such that the NEF network element receives the message 7 from the UDM network element. The message 7 includes the fourth subscription correlation identifier allocated by the UDM network element to the second event. The fourth subscription correlation identifier is used by the NEF network element to subsequently modify or delete a subscription to the second event. For details, refer to an existing implementation. Details are not described herein.

It should be noted that the fourth subscription in this embodiment of this application is a subscription to the second event corresponding to the NEF network element. This is only described herein, and details are not described in the following again.

For example, as shown in FIG. 4, the message 7 in this embodiment of this application may be a subscribe response message 2. This is not specifically limited in this embodiment of this application.

S407. After storing information about a fifth subscription corresponding to the third event, and allocating a fifth subscription correlation identifier (subscription_correlation_ID5) to the third event, the NEF network element sends a message 8 to the AS such that the AS receives the message 8 from the NEF network element. The message 8 includes the fifth subscription correlation identifier allocated by the NEF network element to the third event. The fifth subscription correlation identifier is used by the AS to subsequently modify or delete a subscription to the third event. For details, refer to an existing implementation. Details are not described herein.

It should be noted that the fifth subscription in this embodiment of this application is a subscription to the third event corresponding to the AS. This is only described herein, and details are not described in the following again.

For example, as shown in FIG. 4, the message 8 in this embodiment of this application may be a subscribe response message 1. This is not specifically limited in this embodiment of this application.

According to the foregoing procedure, the AMF 1 network element or the AMF 2 network element performs event monitoring for the terminal in the first user group based on the subscription to the first event.

When the AMF 1 network element detects the corresponding first event, the AMF 1 network element sends an event notification message 1 to the NEF network element, where the event notification message 1 carries the event notification endpoint 2, an identifier of the corresponding terminal, and the detected event 1. If the event reporting information corresponding to the first event includes the maximum quantity of reports corresponding to the first event, the AMF 1 network element further needs to decrease a quantity of remaining reports (remaining number of reports) in a context of the monitored terminal in the first user group by 1 (an initial value of the remaining number of reports in the context of the terminal in the first user group monitored by the AMF 1 network element is equal to the maximum quantity of reports corresponding to the first event).

When the AMF 2 network element detects the corresponding first event, the AMF 2 network element sends an event notification message 2 to the NEF network element, where the event notification message 2 carries the event notification endpoint 2, an identifier of the corresponding terminal, and the detected event 2. If the event reporting information corresponding to the first event includes the maximum quantity of reports corresponding to the first event, the AMF 2 network element further needs to decrease a quantity of remaining reports in a context of the monitored terminal in the first user group by 1 (an initial value of the remaining number of reports in the context of the terminal in the first user group monitored by the AMF 2 network element is equal to the maximum quantity of reports corresponding to the first event).

It should be noted that in this embodiment of this application, steps S401 to S407 are described using one event subscription for the first user group as an example. When the AS subsequently requests to perform event subscription for the first user group, a procedure similar to that in steps S401 to S407 is performed. For example, a difference lies in the following. The UDM network element carries a group correlation identifier 2 when subscribing to an event from the AMF 1 network element or the AMF 2 network element. The group correlation identifier 2 is used to indicate another event subscription for the first user group performed by the UDM network element. This is only described herein, and details are not described in the following again.

It should be noted that steps S401 to S407 in this embodiment of this application provide only an example of a related implementation of one event subscription for the first user group. Certainly, the event subscription may alternatively be performed for the first user group in another alternative manner. This is not specifically limited in this embodiment of this application.

Figure 5A:
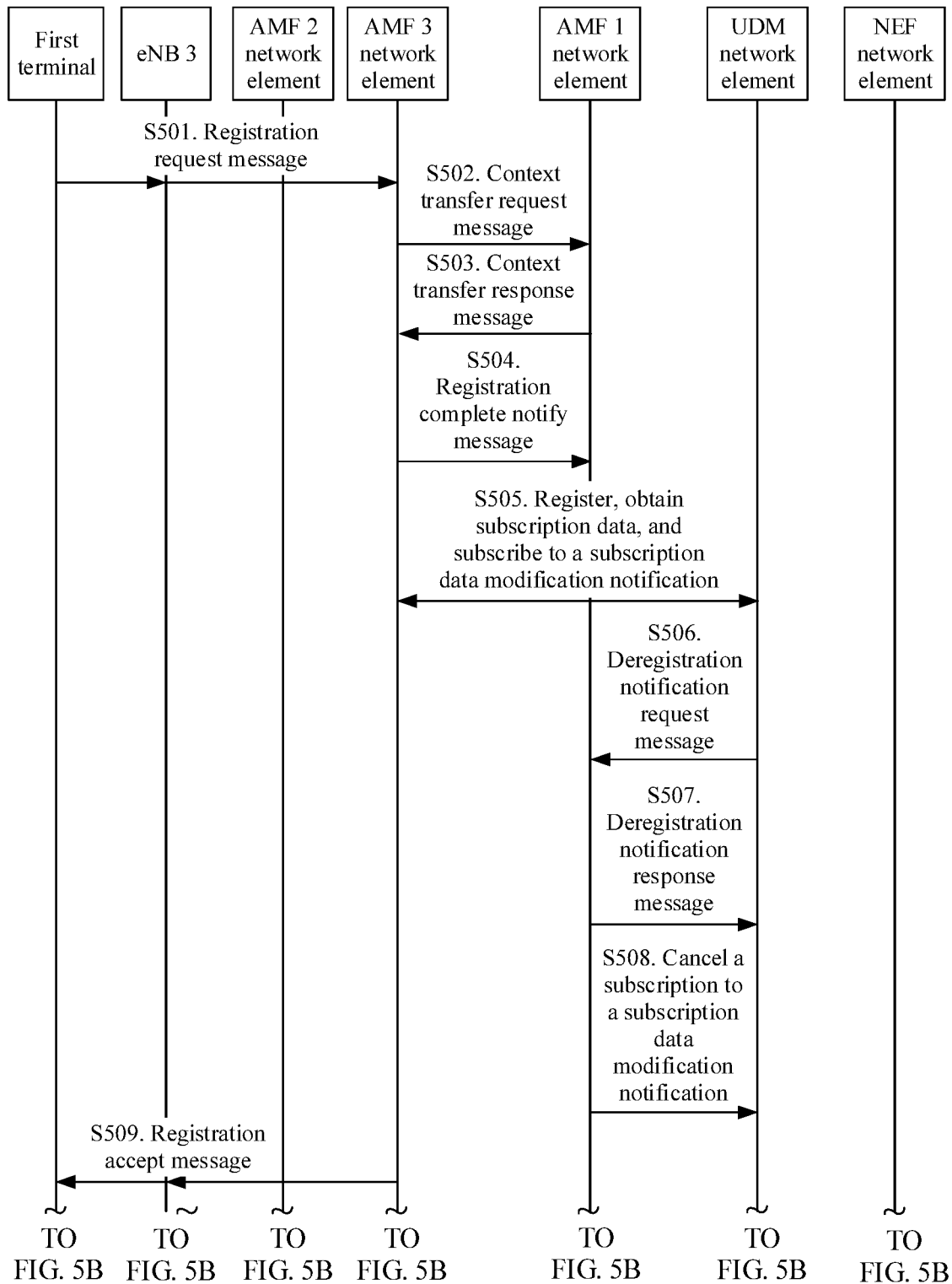
FIG. 5A and FIG. 5B are a second schematic flowchart of a subscription update method according to an embodiment of this application.
Figure 5B:
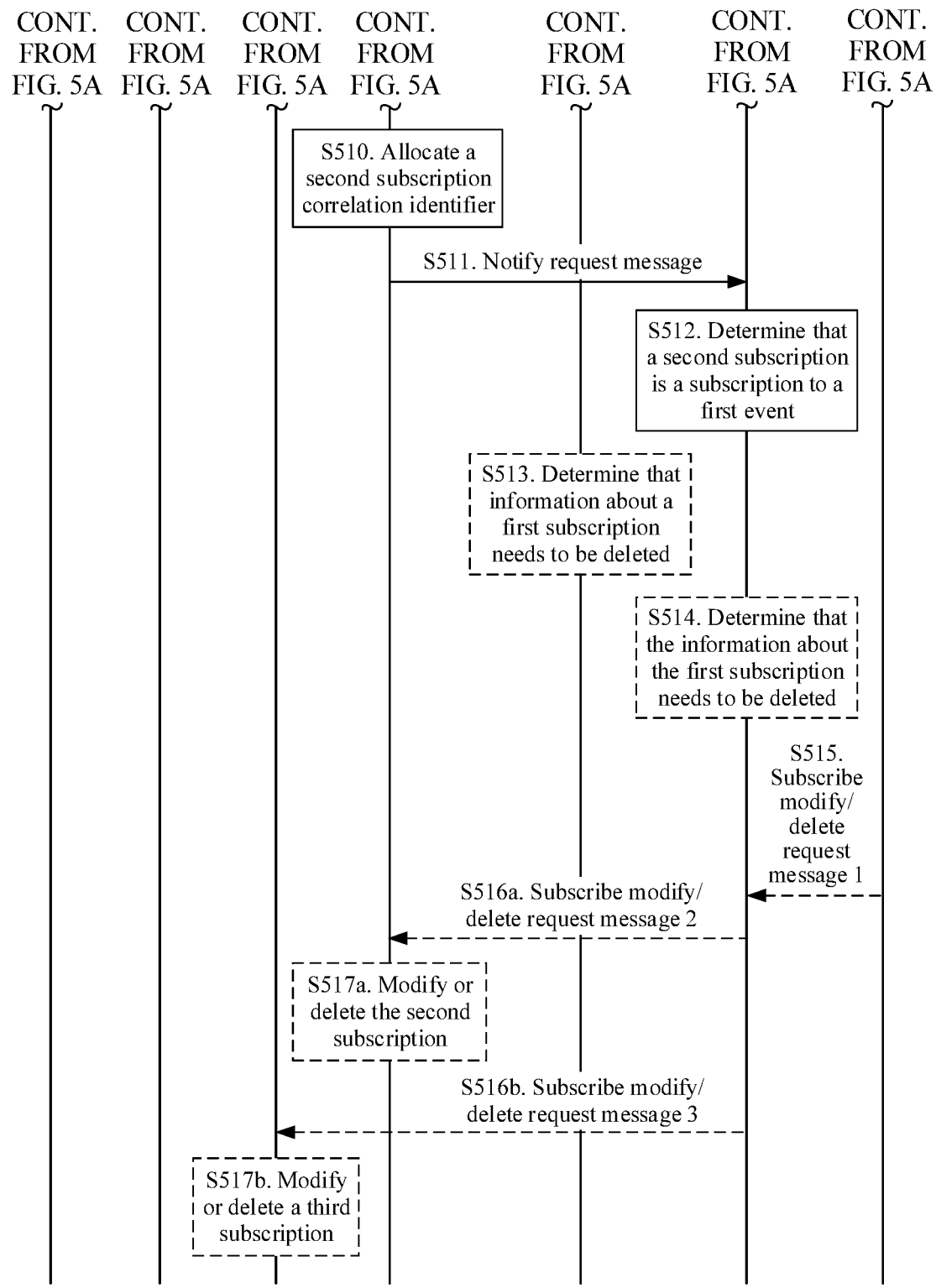

Further, an example in which a first terminal in a first user group moves out of an AMF 1 network element and reselects an AMF 3 network element is used (it may be understood that the following first user group includes one or more terminals, and the following is merely described using an example in which the first terminal in the first user group moves out of the AMF 1 network element and reselects the AMF 3 network element). As shown in FIG. 5A and FIG. 5B, the subscription update method provided in an embodiment of this application may further include the following steps.

S501. The first terminal moves, and sends a message 9 to the AMF 3 network element using an eNB 3 such that the AMF 3 network element receives the message 9 from the first terminal.

For example, as shown in FIG. 5A and FIG. 5B, the message 9 in this embodiment of this application may be a registration request message. This is not specifically limited in this embodiment of this application.

S502. The AMF 3 network element sends a message 10 to the AMF 1 network element such that the AMF 1 network element receives the message 10 from the AMF 3 network element, where the message 10 is used to obtain a mobility management (MM) context of the first terminal.

For example, as shown in FIG. 5A and FIG. 5B, the message 10 in this embodiment of this application may be a context transfer request message. This is not specifically limited in this embodiment of this application.

S503. The AMF 1 network element sends a message 11 to the AMF 3 network element such that the AMF 3 network element receives the message 11 from the AMF 1 network element, where the message 11 includes the MM context of the first terminal.

Optionally, in this embodiment of this application, the MM context of the first terminal may include event subscription information of the first terminal, for example, the information about the first subscription that is stored by the AMF 1 network element in the embodiment shown in FIG. 4. For related descriptions of the information about the first subscription, refer to the description in step S404*a* in the embodiment shown in FIG. 4. Details are not described herein again.

In addition, in this embodiment of this application, if event reporting information corresponding to a first event includes a maximum quantity of reports corresponding to the first event, the information about the first subscription may further include a quantity of remaining reports corresponding to the first event. This is not specifically limited in this embodiment of this application.

For example, as shown in FIG. 5A and FIG. 5B, the message 11 in this embodiment of this application may be a context transfer response message. This is not specifically limited in this embodiment of this application.

S504. The AMF 3 network element sends a message 12 to the AMF 1 network element such that the AMF 1 network element receives the message 12 from the AMF 3 network element, where the message 12 is used to notify the AMF 1 network element that registration of the first terminal with the AMF 3 network element is completed.

For example, as shown in FIG. 5A and FIG. 5B, the message 12 in this embodiment of this application may be a registration complete notify message. This is not specifically limited in this embodiment of this application.

S505. The AMF 3 network element registers with the UDM network element, the AMF 3 network element obtains subscription data of the first terminal from the UDM network element, and the AMF 3 network element subscribes to a subscription data modification notification from the UDM network element.

For a related implementation of step S505, refer to an existing implementation. Details are not described herein.

S506. The UDM network element sends a message 13 to the AMF 1 network element such that the AMF 1 network element receives the message 13 from the UDM network element, where the message 13 is used to request to delete the MM context of the first terminal.

For example, as shown in FIG. 5A and FIG. 5B, the message 13 in this embodiment of this application may be a deregistration notification request message. This is not specifically limited in this embodiment of this application.

S507. The AMF 1 network element sends a message 14 to the UDM network element such that the UDM network element receives the message 14 from the AMF 1 network element, where the message 14 is used to notify that the MM context of the first terminal has been deleted.

For example, as shown in FIG. 5A and FIG. 5B, the message 14 in this embodiment of this application may be a deregistration notification response message. This is not specifically limited in this embodiment of this application.

S508. The AMF 1 network element cancels a subscription to a subscription data modification notification from the UDM network element.

S509. The AMF 3 network element sends a message 15 to the first terminal using the eNB 3 such that the first terminal receives the message 15 from the AMF 3 network element.

It should be noted that, step S504 to step S509 merely provide examples of some registration-related procedures. Certainly, the foregoing registration procedure may alternatively be replaced with another registration procedure. This is not specifically limited in this embodiment of this application.

For example, as shown in FIG. 5A and FIG. 5B, the message 15 in this embodiment of this application may be a registration accept message. This is not specifically limited in this embodiment of this application.

S510. The AMF 3 network element allocates a second subscription correlation identifier (subscription_correlation_ID2) to the first event if the AMF 3 network element determines that the AMF 3 network element has no subscription to the first event, where the second subscription correlation identifier is used by the UDM network element to subsequently modify or delete a second subscription.

Optionally, in this embodiment of this application, if a group correlation identifier 1 included in the information about the first subscription in step S503 is unique within a range of different user groups, the AMF 3 network element may determine, based on the group correlation identifier 1 included in the information about the first subscription in step S503, that the AMF 3 network element has no subscription to the first event. For example, the AMF 3 network element queries information about a subscription of the AMF 3 network element, and if the AMF 3 network element learns that information about one or more subscriptions of the AMF 3 network element does not include the group correlation identifier 1, the AMF 3 network element may determine that the AMF 3 network element has no subscription to the first event. This is not specifically limited in this embodiment of this application.

Optionally, in this embodiment of this application, if a group correlation identifier 1 included in the information about the first subscription in step S503 is only unique within a range of the first user group, the AMF 3 network element may determine, based on the group correlation identifier 1 and an internal group identifier corresponding to the first event that are included in the information about the first subscription in step S503, that the AMF 3 network element has no subscription to the first event. For example, the AMF 3 network element queries information about a subscription of the AMF 3 network element, and if the AMF 3 network element learns that information about one or more subscriptions of the AMF 3 network element does not include the group correlation identifier 1 and the internal group identifier corresponding to the first event, the AMF 3 network element may determine that the AMF 3 network element has no subscription to the first event. This is not specifically limited in this embodiment of this application.

Optionally, in this embodiment of this application, the AMF 3 network element may allocate a second subscription correlation identifier to the first event if determining that the AMF 3 network element has no subscription for the first user group. This is not specifically limited in this embodiment of this application. In this embodiment of this application, the AMF 3 network element may determine, based on an internal group identifier corresponding to the first event included in the information about the first subscription in step S503, that the AMF 3 network element has no subscription for the first user group. For example, the AMF 3 network element queries information about a subscription of the AMF 3 network element, and if the AMF 3 network element learns that information about one or more subscriptions of the AMF 3 network element does not include the internal group identifier corresponding to the first event, the AMF 3 network element may determine that the AMF 3 network element has no subscription to the first event. This is not specifically limited in this embodiment of this application.

Optionally, in this embodiment of this application, the AMF 3 network element allocates the second subscription correlation identifier to the second event. This may include, for example the AMF 3 network element creates the second subscription based on the information about the first subscription in step S503, and allocates the second subscription correlation identifier to the second subscription. This is not specifically limited in this embodiment of this application.

For example, that the AMF 3 network element creates the second subscription based on the information about the first subscription may include creating, based on the information about the first subscription, a sub-resource for a uniform resource identifier (URI) {apiRoot}/namf-evts/v1/subscriptions/ (that is, storing the information about the first subscription in the sub-resource). A URI of the sub-resource is {apiRoot}/namf-evts/v1/subscriptions/{subscriptionId}, and a value of subscriptionId is the second subscription correlation identifier. In addition, if the AMF 3 network element receives specific information of the first terminal (for example, the quantity of remaining reports corresponding to the first terminal), the AMF 3 network element further needs to associate the specific information of the first terminal with the second subscription. This is not specifically limited in this embodiment of this application.

S511. The AMF 3 network element sends a message 16 to the UDM network element such that the UDM network element receives the message 16 from the AMF 3 network element, where the message 16 includes an event notification endpoint 11 and the group correlation identifier 1 that correspond to the first event in the information about the first subscription, and the second subscription correlation identifier allocated by the AMF 3 network element to the second subscription.

In this case, the event notification endpoint 11 corresponding to the first event is used to uniquely identify a subscription notification corresponding to the second subscription. This is only described herein, and details are not described in the following again.

Optionally, the message 16 in this embodiment of this application may further include indication information 1, and the indication information 1 is used to indicate that the second subscription correlation identifier is a newly added subscription correlation identifier corresponding to the first event. This is not specifically limited in this embodiment of this application.

Optionally, the indication information 1 in this embodiment of this application may be explicit indication information. For example, the indication information 1 is carried in a field in the message 16. This is not specifically limited in this embodiment of this application.

For example, as shown in FIG. 5A and FIG. 5B, the message 16 in this embodiment of this application may be a notify request message. This is not specifically limited in this embodiment of this application.

S512. The UDM network element determines, based on the group correlation identifier 1, that the second subscription correlation identifier corresponds to a subscription to the first event, or determines, based on the group correlation identifier 1, that the second subscription is a subscription to the first event.

Optionally, in this embodiment of this application, after determining that the second subscription correlation identifier corresponds to the subscription to the first event, or determining that the second subscription is the subscription to the first event, the UDM network element may further determine that the second subscription correlation identifier corresponds to a subscription to the second event. In this way, when the NEF network element subsequently modifies or deletes the subscription to the second event, the UDM network element may modify or delete the second subscription based on the second subscription correlation identifier. When the second subscription is modified or deleted, specific information of a terminal in the first user group (for example, a quantity of remaining reports corresponding to the terminal in the first user group) associated with the second subscription may be further modified or deleted. This is not specifically limited in this embodiment of this application.

Optionally, after the UDM network element determines that the second subscription correlation identifier corresponds to the subscription to the first event, or determines that the second subscription is the subscription to the first event, if the UDM network element subsequently needs to modify or delete the subscription to the first event, the UDM network element may modify or delete the second subscription based on the second subscription correlation identifier. When the second subscription is modified or deleted, specific information of a terminal in the first user group (for example, a quantity of remaining reports corresponding to the terminal in the first user group) associated with the second subscription may be further modified or deleted. This is not specifically limited in this embodiment of this application.

Optionally, the subscription update method provided in this embodiment of this application may further include the following steps S513 to S514.

S513. The AMF 1 network element determines that the information about the first subscription needs to be deleted.

Optionally, in this embodiment of this application, that the AMF 1 network element determines that the information about the first subscription needs to be deleted may include the following. The AMF 1 network element determines that no terminal in the first user group is registered with the AMF 1 network element (that is, the currently migrated first terminal is the last terminal that is registered with the AMF 1 network element in the first user group).

In this embodiment of this application, after determining that the information about the first subscription needs to be deleted, the AMF 1 network element may locally delete the information about the first subscription. For related descriptions of the information about the first subscription, refer to step S404a. Details are not described herein again.

S514. The UDM network element determines that the information about the first subscription needs to be deleted.

Optionally, in this embodiment of this application, that the UDM network element determines that the information about the first subscription needs to be deleted may include the following. The UDM network element determines that no terminal in the first user group is registered with the AMF 1 network element (that is, the currently migrated first terminal is the last terminal that is registered with the AMF 1 network element in the first user group). Alternatively, after performing step S513, the AMF 1 network element sends a message 17 to the UDM network element such that the UDM network element receives the message 17 from the AMF 1 network element. Further, the UDM network element determines, based on the message 17, that the information about the first subscription needs to be deleted. The message 17 is used to notify that no terminal in the first user group is registered with the AMF 1 network element. Alternatively, the message 17 is used to instruct the UDM network element to delete the information about the first subscription. Alternatively, the message 17 is used to notify that the AMF 1 network element has deleted the information about the first subscription. This is not specifically limited in this embodiment of this application.

In this embodiment of this application, after determining that the information about the first subscription needs to be deleted, the UDM network element may delete the information about the first subscription stored in the UDM network element. For example, the information about the first subscription stored in the UDM network element may include the first subscription correlation identifier. This is not specifically limited in this embodiment of this application.

It should be noted that in this embodiment of this application, step S513 and step S514 are not performed in a necessary sequence. Step S513 may be performed before step S514, step S514 may be performed before step S513, or step S514 and step S513 may be simultaneously performed. This is not specifically limited in this embodiment of this application.

Optionally, in this embodiment of this application, after the UDM network element deletes the information about the first subscription, corresponding to the scenario in the embodiment shown in FIG. 4, the subscription update method provided in this embodiment of this application may further include the following steps S515, S516a and S517a, and S516b and S517b.

S515. The NEF network element sends a message 18 to the UDM network element such that the UDM network element receives the message 18 from the NEF network element, where the message 18 is used to request to modify or delete the subscription to the second event.

For example, as shown in FIG. 5A and FIG. 5B, the message 18 in this embodiment of this application may be a subscribe modify/delete request message 1. This is not specifically limited in this embodiment of this application.

S516a. The UDM network element sends a message 19 to the AMF 3 network element such that the AMF 3 network element receives the message 19 from the UDM network element, where the message 19 carries the second subscription correlation identifier, and is used to request to modify or delete the second subscription.

For example, as shown in FIG. 5A and FIG. 5B, the message 19 in this embodiment of this application may be a subscribe modify/delete request message 2. This is not specifically limited in this embodiment of this application.

S517a. The AMF 3 network element modifies or deletes the second subscription based on the message 19.

Optionally, in this embodiment of this application, for example, that the AMF 3 network element modifies or deletes the second subscription may include modifying or deleting the second subscription, and modifying or deleting the specific information of the terminal in the first user group that is associated with the second subscription (for example, the quantity of remaining reports corresponding to the terminal in the first user group that is associated with the second subscription) and that is stored in the AMF 3 network element. This is not specifically limited in this embodiment of this application.

S516b. The UDM network element sends a message 20 to an AMF 2 network element such that the AMF 2 network element receives the message 20 from the UDM network element, where the message 20 carries a third subscription correlation identifier, and is used to request to modify or delete a third subscription.

For example, as shown in FIG. 5A and FIG. 5B, the message 20 in this embodiment of this application may be a subscribe modify/delete request message 3. This is not specifically limited in this embodiment of this application.

S517b. The AMF 2 network element modifies or deletes the third subscription based on the message 20.

Optionally, in this embodiment of this application, for example, that the AMF 2 network element modifies or deletes the third subscription may include modifying or deleting the third subscription, and modifying or deleting specific information of a terminal in the first user group that is associated with the third subscription (for example, a quantity of remaining reports corresponding to the terminal in the first user group that is associated with the third subscription) and that is stored in the AMF 2 network element. This is not specifically limited in this embodiment of this application.

In other words, in this embodiment of this application, after receiving, from the NEF network element, the message 18 used to request to modify or delete the subscription to the second event, the UDM network element separately sends, based on the message 18 to one or more AMF network elements that currently serve a terminal in the first user group, a message carrying a corresponding subscription correlation identifier such that the one or more AMF network elements that currently serve the terminal in the first user group separately modify or delete a subscription to the first event based on the subscription correlation identifier carried in the message, and delete specific information of the terminal in the first user group that is associated with the subscription to the first event (for example, a quantity of remaining reports corresponding to the terminal in the first user group that is associated with the subscription to the first event) and that is stored in the one or more AMF network elements. This is not specifically limited in this embodiment of this application.

It should be noted that, in the embodiment shown in FIG. 5A and FIG. 5B, an example in which the MM context of the first terminal includes the information about the first subscription is used for description. If the MM context of the first terminal includes information about one or more other subscriptions for the first user group, the AMF 3 network element allocates a corresponding subscription correlation identifier to the one or more other subscriptions for the first user group, and adds a group correlation identifier corresponding to the subscription to the allocated subscription correlation identifier when sending the allocated subscription correlation identifier to the UDM network element. For related descriptions, refer to the embodiment shown in FIG. 5A and FIG. 5B. Details are not described herein again.

According to the subscription update method provided in this embodiment of this application, when the first terminal in the first user group is migrated, related processing may be performed on the subscription to the first event such that a network can still continue to perform effective event monitoring for the first terminal. For related descriptions, refer to the part of the foregoing subscription update system. Details are not described herein again.

The actions of the UDM network element or the AMF 3 network element in steps S501 to S517a or S517b may be performed by the processor 301 in the communications device 300 shown in FIG. 3 by invoking the application program code stored in the memory 303. This is not limited in this embodiment.

Figure 6:
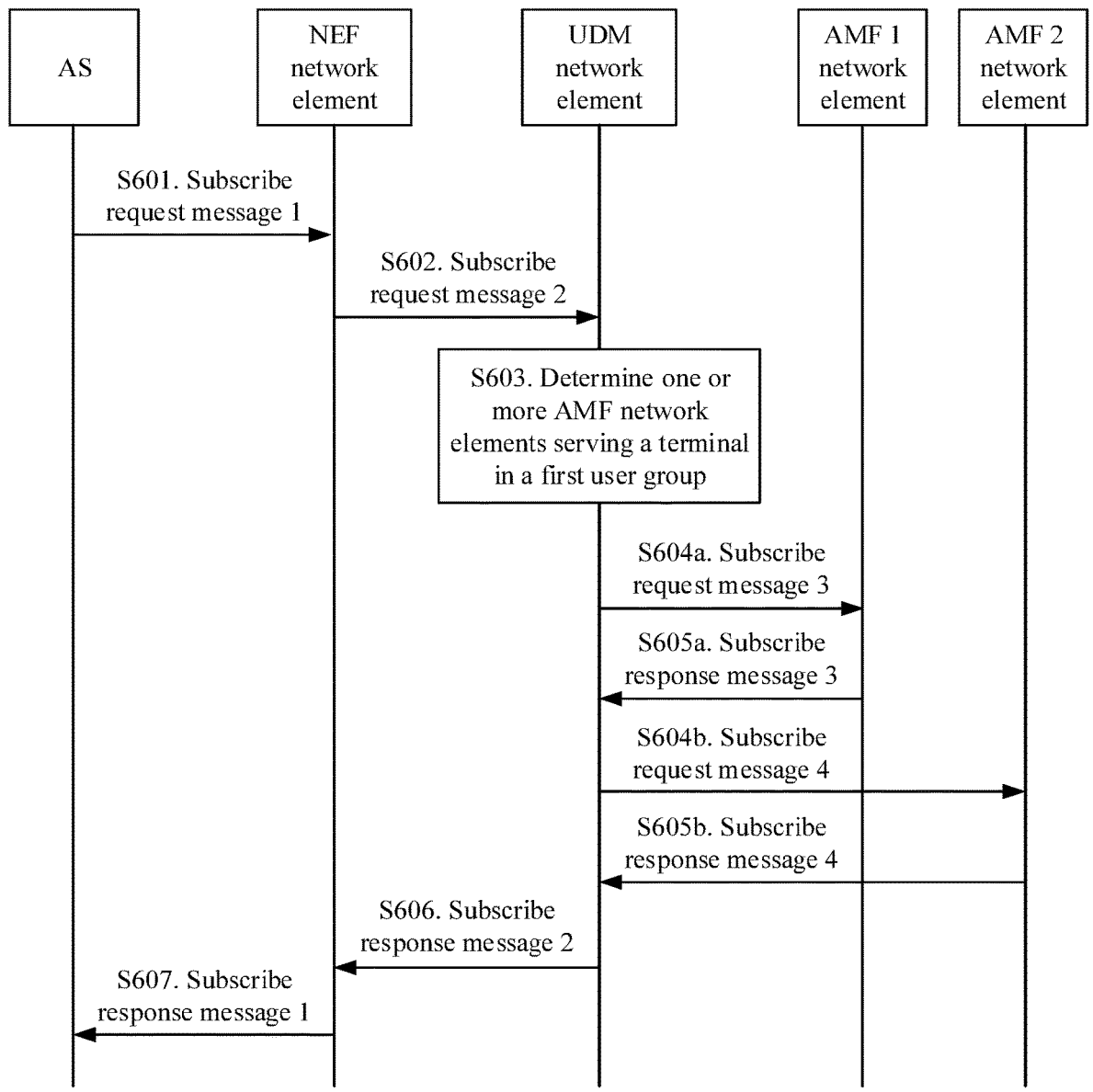
FIG. 6 is a third schematic flowchart of a subscription update method according to an embodiment of this application.

Optionally, that the subscription update system shown in FIG. 1A or FIG. 1B is applied to the 5G network shown in FIG. 2, and the AF network element is an AS is used as an example. FIG. 6 shows a subscription update method according to an embodiment of this application. The subscription update method includes the following steps S601 to S607.

S601 to S603 are the same as steps S401 to S403 in the embodiment shown in FIG. 4. For related descriptions, refer to the embodiment shown in FIG. 4. Details are not described herein again.

S604a to S605a are similar to steps S404a to S405a in the embodiment shown in FIG. 4. For example, a difference lies in the following. In this embodiment of this application, the message 3 does not include the group correlation identifier 1, and correspondingly, the information about the first subscription does not include the group correlation identifier 1 either. In addition, in this embodiment of this application, the event notification endpoint 11 is used to identify a subscription notification corresponding to the first event. For other related descriptions, refer to the embodiment shown in FIG. 4. Details are not described herein again.

S604b to S605b are similar to steps S404b to S405b in the embodiment shown in FIG. 4. For example, a difference lies in the following. In this embodiment of this application, the message 5 does not include the group correlation identifier 1, and correspondingly, the information about the third subscription does not include the group correlation identifier 1 either. In addition, in this embodiment of this application, the event notification endpoint 12 corresponding to the first event is the same as the event notification endpoint 11 corresponding to the first event in steps S604a to S605a. For other related descriptions, refer to the embodiment shown in FIG. 4. Details are not described herein again.

It should be noted that in this embodiment of this application, step S604a and step S604b are not performed in a necessary sequence. Step S604a may be performed before step S604b, step S604b may be performed before step S604a, or step S604a and step S604b may be simultaneously performed. This is not specifically limited in this embodiment of this application.

Similarly, in this embodiment of this application, step S605a and step S605b are not performed in a necessary sequence. Step S605a is performed after step S604a, and step S605b is performed after step S604b.

S606 to S607 are the same as steps S406 to S407 in the embodiment shown in FIG. 4. For related descriptions, refer to the embodiment shown in FIG. 4. Details are not described herein again.

It should be noted that in this embodiment of this application, steps S601 to S607 are described using one event subscription for the first user group as an example. When the AS subsequently requests to perform event subscription for the first user group, a procedure similar to that in steps S401 to S407 is performed. For example, a difference lies in the following. The UDM carries an event notification endpoint different from the event notification endpoint 11 when subscribing to the first event from the AMF 1 network element and the AMF 2 network element. The event notification endpoint different from the event notification endpoint 11 is used to indicate another event subscription for the first user group performed by the UDM network element. This is only described herein, and details are not described in the following again.

It should be noted that steps S601 to S607 in this embodiment of this application provide only an example of a related implementation of one event subscription for the first user group. Certainly, the event subscription may alternatively be performed for the first user group in another alternative manner. This is not specifically limited in this embodiment of this application.

Figure 7A:
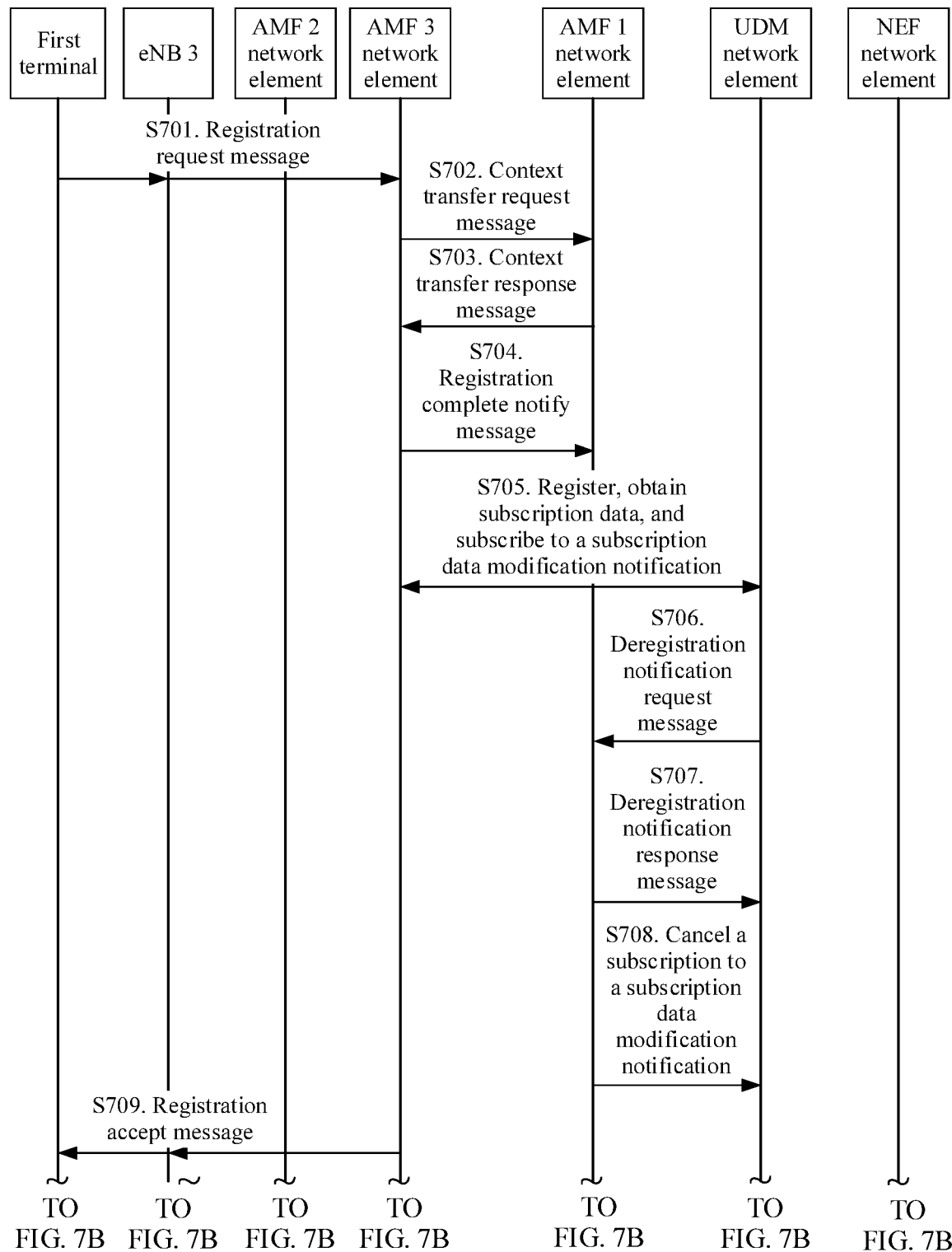
FIG. 7A and FIG. 7B are a fourth schematic flowchart of a subscription update method according to an embodiment of this application.
Figure 7B:
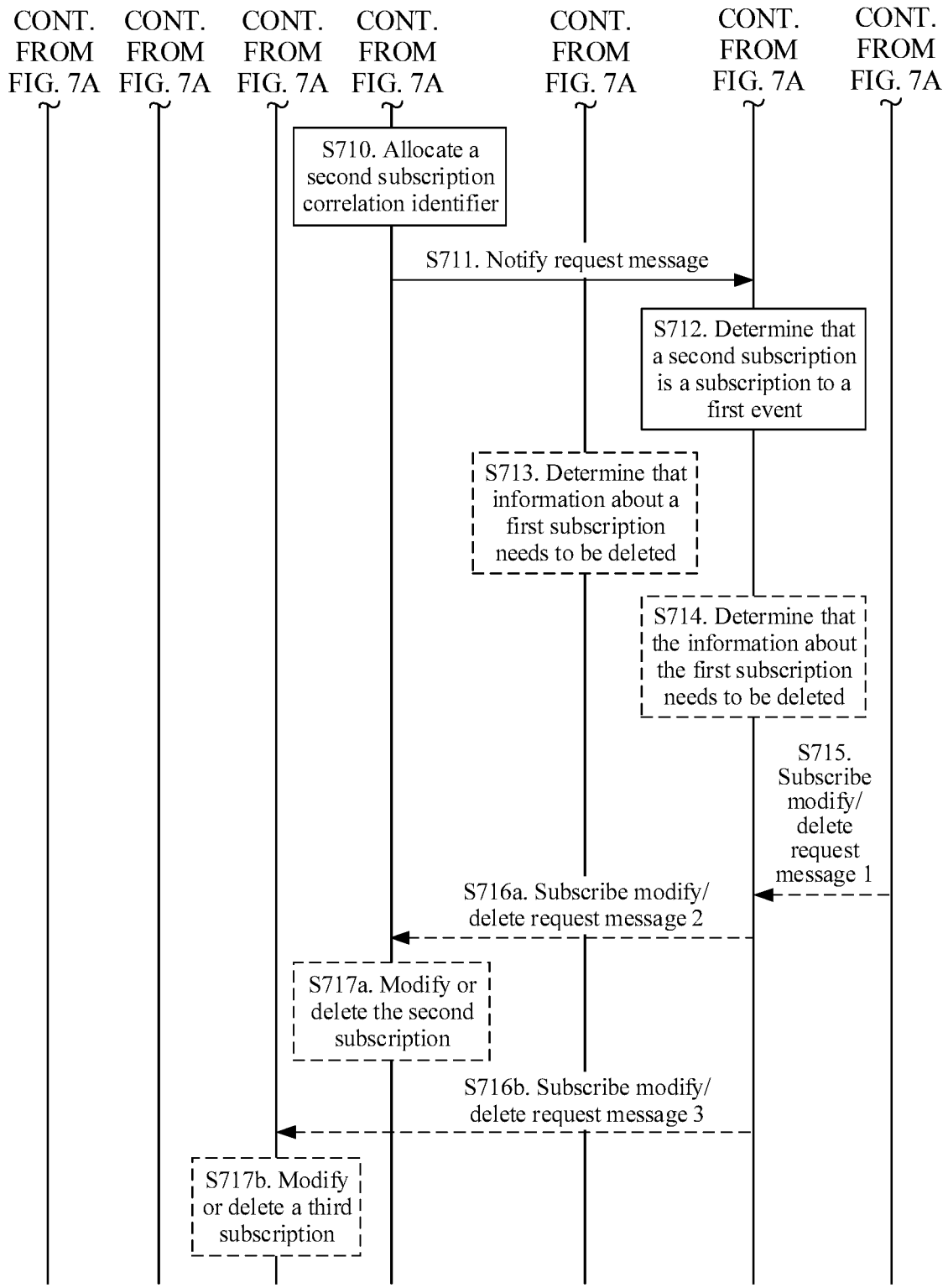

Further, an example in which a first terminal in a first user group moves out of an AMF 1 network element and reselects an AMF 3 network element is used (it may be understood that the following first user group includes one or more terminals, and the following is merely described using an example in which the first terminal in the first user group moves out of the AMF 1 network element and reselects the AMF 3 network element). As shown in FIG. 7A and FIG. 7B, the subscription update method provided in an embodiment of this application may further include the following steps.

S701 to S709 are similar to steps S501 to S509 in the embodiment shown in FIG. 5A and FIG. 5B. For example, a difference lies in the following. In this embodiment of this application, the information about the first subscription does not include the group correlation identifier 1 in the embodiment shown in FIG. 5A and FIG. 5B. For other related descriptions, refer to the embodiment shown in FIG. 4. Details are not described herein again.

It should be noted that, step S704 to step S709 merely provide examples of some registration-related procedures. Certainly, the foregoing registration procedure may alternatively be replaced with another registration procedure. This is not specifically limited in this embodiment of this application.

S710. If the AMF 3 network element determines that the AMF 3 network element has no subscription to the first event, the AMF 3 network element allocates a second subscription correlation identifier (subscription_correlation_ID2) to the first event, where the second subscription correlation identifier is used by the UDM network element to subsequently modify or delete a subscription to the first event.

Optionally, in this embodiment of this application, the AMF 3 network element may determine, based on the event notification endpoint 11 included in the information about the first subscription in step S503, that the AMF 3 network element has no subscription to the first event. For example, the AMF 3 network element queries information about a subscription of the AMF 3 network element, and if the AMF 3 network element learns that information about one or more subscriptions of the AMF 3 network element does not include the event notification endpoint 11, the AMF 3 network element may determine that the AMF 3 network element has no subscription to the first event. This is not specifically limited in this embodiment of this application.

Optionally, in this embodiment of this application, the AMF 3 network element may allocate a second subscription correlation identifier to the first event if determining that the AMF 3 network element has no subscription for the first user group. This is not specifically limited in this embodiment of this application. In this embodiment of this application, the AMF 3 network element may determine, based on an internal group identifier corresponding to the first event included in the information about the first subscription in step S503, that the AMF 3 network element has no subscription for the first user group. For example, the AMF 3 network element queries information about a subscription of the AMF 3 network element, and if the AMF 3 network element learns that information about one or more subscriptions of the AMF 3 network element does not include the internal group identifier corresponding to the first event, the AMF 3 network element may determine that the AMF 3 network element has no subscription to the first event. This is not specifically limited in this embodiment of this application.

Optionally, in this embodiment of this application, for related descriptions of allocating, by the AMF 3 network element, the second subscription correlation identifier to the second event, refer to step S510 in the embodiment shown in FIG. 5A and FIG. 5B. Details are not described herein again.

S711. The AMF 3 network element sends a message 21 to the UDM network element such that the UDM network element receives the message 21 from the AMF 3 network element, where the message 21 includes the event notification endpoint 11 corresponding to the first event in the information about the first subscription, and the second subscription correlation identifier allocated by the AMF 3 network element to the second subscription.

Optionally, the message 21 in this embodiment of this application may further include indication information 1, and the indication information 1 is used to indicate that the second subscription correlation identifier is a newly added subscription correlation identifier corresponding to the first event. For related descriptions, refer to step S511 in the embodiment shown in FIG. 5A and FIG. 5B. Details are not described herein.

For example, as shown in FIG. 7A and FIG. 7B, the message 21 in this embodiment of this application may be a notify request message. This is not specifically limited in this embodiment of this application.

S712. The UDM network element determines, based on the event notification endpoint 11, that the second subscription correlation identifier corresponds to a subscription to the first event, or determines, based on the event notification endpoint 11, that the second subscription is a subscription to the first event.

Optionally, in this embodiment of this application, after determining that the second subscription correlation identifier corresponds to the subscription to the first event, or determining that the second subscription is the subscription to the first event, the UDM network element may further determine that the second subscription correlation identifier corresponds to a subscription to the second event. In this way, when the NEF network element subsequently modifies or deletes the subscription to the second event, the UDM network element may modify or delete the subscription to the first event based on the second subscription correlation identifier. When the second subscription is modified or deleted, specific information of a terminal in the first user group (for example, a quantity of remaining reports corresponding to the terminal in the first user group) associated with the second subscription may be further modified or deleted. This is not specifically limited in this embodiment of this application.

Optionally, after the UDM network element determines that the second subscription correlation identifier corresponds to the subscription to the first event, or determines that the second subscription is the subscription to the first event, if the UDM network element subsequently needs to modify or delete the subscription to the first event, the UDM network element may modify or delete the subscription to the first event based on the second subscription correlation identifier. When the second subscription is modified or deleted, specific information of a terminal in the first user group (for example, a quantity of remaining reports corresponding to the terminal in the first user group) associated with the second subscription may be further modified or deleted. This is not specifically limited in this embodiment of this application.

Optionally, the subscription update method provided in this embodiment of this application may further include the following steps S713 to S714.

S713 and S714 are the same as steps S513 and S514 in the embodiment shown in FIG. 5A and FIG. 5B. For related descriptions, refer to the embodiment shown in FIG. 5A and FIG. 5B. Details are not described herein again.

Optionally, in this embodiment of this application, after the UDM network element deletes the information about the first subscription, corresponding to the scenario in the embodiment shown in FIG. 4, the subscription update method provided in this embodiment of this application may further include the following steps S715, S716a and S717a, and S716b and S717b.

S715 is the same as step S515 in the embodiment shown in FIG. 5A and FIG. 5B. For related descriptions, refer to the embodiment shown in FIG. 5A and FIG. 5B. Details are not described herein again.

S716a and S717a are the same as steps S516a and S517a in the embodiment shown in FIG. 5A and FIG. 5B. For related descriptions, refer to the embodiment shown in FIG. 5A and FIG. 5B. Details are not described herein again.

S716b and S717b are the same as steps S516b and S517b in the embodiment shown in FIG. 5A and FIG. 5B. For related descriptions, refer to the embodiment shown in FIG. 5A and FIG. 5B. Details are not described herein again.

It should be noted that, in the embodiment shown in FIG. 7A and FIG. 7B, an example in which the MM context of the first terminal includes the information about the first subscription is used for description. If the MM context of the first terminal includes information about one or more other subscriptions for the first user group, the AMF 3 network element allocates a corresponding subscription correlation identifier to the one or more other subscriptions for the first user group, and adds a corresponding event notification endpoint to the allocated subscription correlation identifier when sending the allocated subscription correlation identifier to the UDM network element. For related descriptions, refer to the embodiment shown in FIG. 7A and FIG. 7B. Details are not described herein again.

According to the subscription update method provided in this embodiment of this application, when the first terminal in the first user group is migrated, related processing may be performed on the subscription to the first event such that a network can still continue to perform effective event monitoring for the first terminal. For related descriptions, refer to the part of the foregoing subscription update system. Details are not described herein again.

The actions of the UDM network element or the AMF 3 network element in steps S701 to S717a or S717b may be performed by the processor 301 in the communications device 300 shown in FIG. 3 by invoking the application program code stored in the memory 303. This is not limited in this embodiment.

Figure 8A:
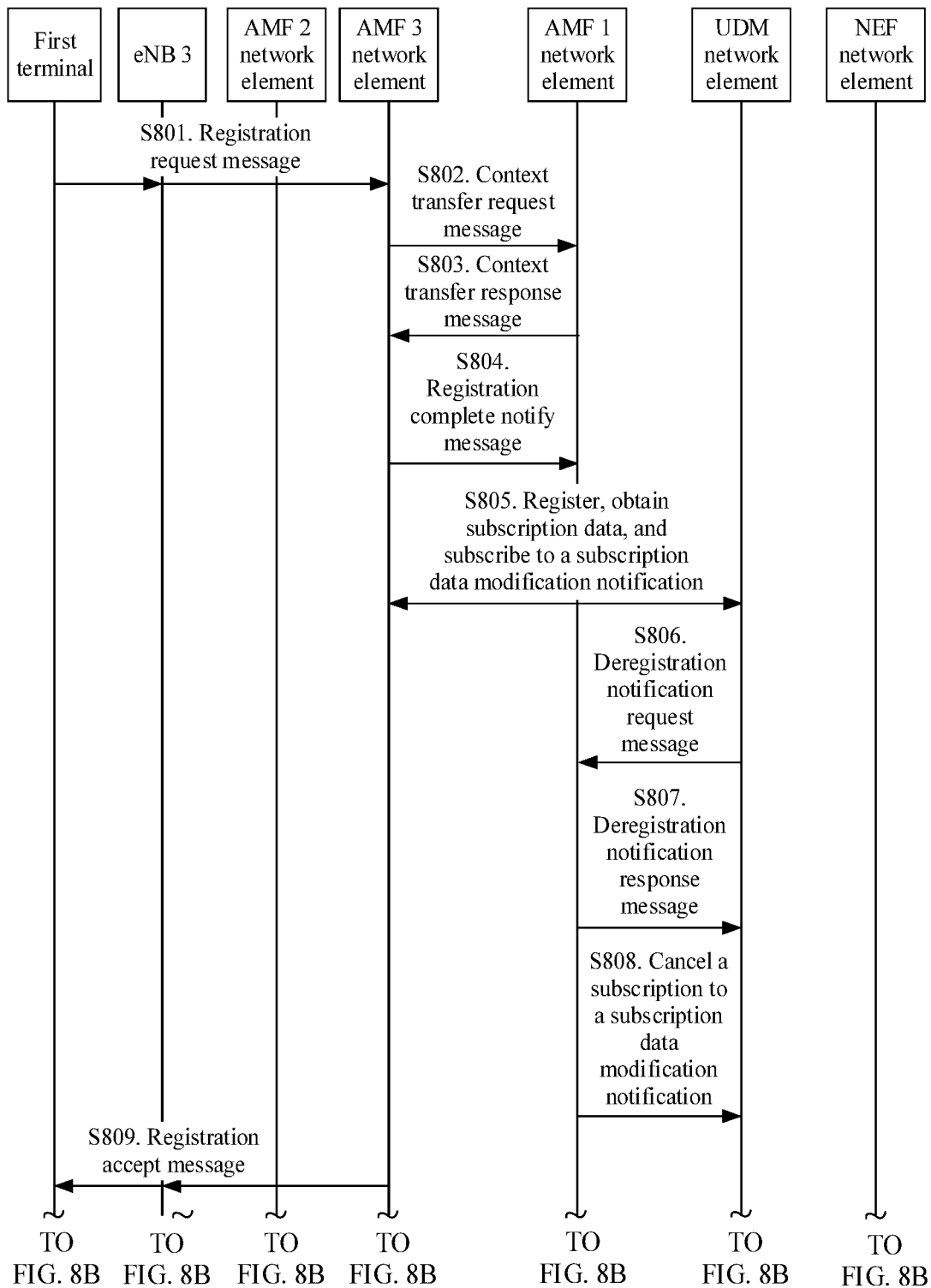
FIG. 8A and FIG. 8B are a fifth schematic flowchart of a subscription update method according to an embodiment of this application.
Figure 8B:
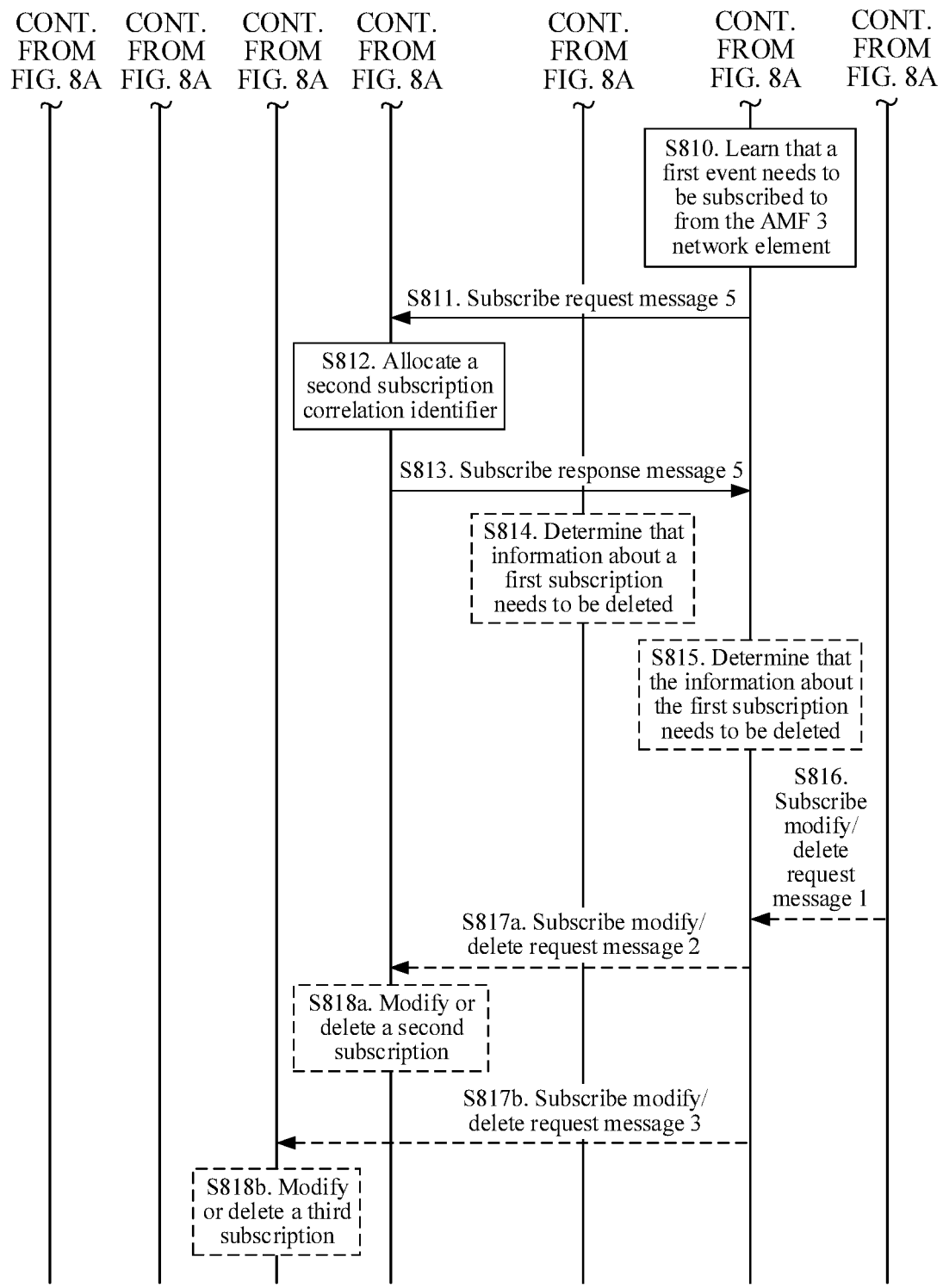

Optionally, according to the subscription update method shown in FIG. 4, an example in which a first terminal in a first user group moves out of an AMF 1 network element and reselects an AMF 3 network element is used (it may be understood that the following first user group includes one or more terminals, and the following is merely described using an example in which the first terminal in the first user group moves out of the AMF 1 network element and reselects the AMF 3 network element). As shown in FIG. 8A and FIG. 8B, the subscription update method provided in an embodiment of this application may further include the following steps.

S801 and S809 are the same as steps S501 and S509 in the embodiment shown in FIG. 5A and FIG. 5B. For related descriptions, refer to the embodiment shown in FIG. 5A and FIG. 5B. Details are not described herein again.

S810. The UDM network element learns that the first event needs to be subscribed to from the AMF 3 network element.

Optionally, in this embodiment of this application, that the UDM network element learns that the first event needs to be subscribed to from the AMF 3 network element may include, when the AMF 3 network element determines that the AMF 3 network element has no subscription to the first event, the AMF 3 network element sends a notification message to the UDM network element, where the notification message carries the group correlation identifier 1. Further, the UDM network element may learn, based on the group correlation identifier 1, that the first event needs to be subscribed to from the AMF 3 network element.

Optionally, in this embodiment of this application, that the UDM network element learns that the first event needs to be subscribed to from the AMF 3 network element may include, when the AMF 3 network element determines that the AMF 3 network element has no subscription to the first event, the AMF 3 network element sends a notification message to the UDM network element, where the notification message carries the group correlation identifier 1 and an internal group identifier corresponding to the first event. Further, the UDM network element may learn, based on the group correlation identifier 1 and the internal group identifier, that the first event needs to be subscribed to from the AMF 3 network element.

Optionally, in this embodiment of this application, that the UDM network element learns that the first event needs to be subscribed to from the AMF 3 network element may include, when the AMF 3 network element determines that the AMF 3 network element has no subscription to the first event, the AMF 3 network element sends a notification message to the UDM network element, where the notification message includes an identifier of the first terminal. Further, the UDM network element may learn of, based on the identifier of the first terminal, the first user group to which the first terminal belongs, and may further learn that the first event needs to be subscribed to from the AMF 3 network element. This is not specifically limited in this embodiment of this application.

S811. The UDM network element sends a message 22 to the AMF 3 network element such that the AMF 3 network element receives the message 22 from the UDM network element, where the message 22 includes an event identifier corresponding to the first event, the internal group identifier corresponding to the first event, an event notification endpoint 13 and event reporting information corresponding to the first event, and the event notification endpoint 2 corresponding to the second event that is included in the message 2.

In addition, the message 22 may further include the group correlation identifier 1, and the group correlation identifier 1 is used to indicate a subscription to the first event. This is not specifically limited in this embodiment of this application.

Optionally, the message 22 in this embodiment of this application may further include indication information 2, and the indication information 2 is used to indicate that the AMF 3 network element does not need to reset the information about the first subscription based on an event subscription request. For example, that the indication information 2 is used to indicate that the AMF 3 network element does not need to reset the information about the first subscription based on the event subscription request may include, for example the indication information 2 is used to indicate that the AMF 3 network element does not need to reset a quantity of remaining reports in the information about the first subscription based on a maximum quantity of reports in the event subscription request.

For related descriptions of the first event and the internal group identifier corresponding to the first event, refer to the foregoing step S404a. Details are not described herein again.

Optionally, in this embodiment of this application, the event notification endpoint 13 includes a notification target address 13. Optionally, the event notification endpoint 13 may further include a notification correlation identifier 13. This is not specifically limited in this embodiment of this application. In this embodiment of this application, if a value of the notification target address 13 can uniquely identify a subscription notification corresponding to a second subscription, the event notification endpoint 13 may not include the notification correlation identifier 13. If a value of the notification target address 13 cannot uniquely identify a subscription notification corresponding to a second subscription, the notification target address 13 and the notification correlation identifier 13 are needed to uniquely identify the subscription notification corresponding to the second subscription. This is only described herein, and details are not described in the following again.

For related descriptions of the event reporting information corresponding to the first event, refer to step S404a. Details are not described herein again.

For example, as shown in FIG. 8A and FIG. 8B, the message 22 in this embodiment of this application may be a subscribe request message 5. This is not specifically limited in this embodiment of this application.

S812. The AMF 3 network element associates the second subscription with the information about the first subscription based on the group correlation identifier 1, and the AMF 3 network element allocates a second subscription correlation identifier to the first event. The second subscription correlation identifier is used by the UDM network element to subsequently modify or delete the second subscription. For details, refer to an existing implementation. Details are not described herein.

Optionally, in this embodiment of this application, that the AMF 3 network element associates the second subscription with the information about the first subscription based on the group correlation identifier 1 may be, for example the AMF 3 network element associates, based on the group correlation identifier 1, specific information of the first terminal (for example, a quantity of remaining reports corresponding to the first terminal) associated with the first subscription with the second subscription. This is not specifically limited in this embodiment of this application.

S813. The AMF 3 network element sends a message 23 to the UDM network element such that the UDM network element receives the message 23 from the AMF 3 network element, where the message 23 includes the second subscription correlation identifier allocated by the AMF 3 network element to the first event.

In this way, after receiving the message 23, the UDM network element may store the second subscription correlation identifier. The second subscription correlation identifier is used by the UDM network element to subsequently modify or delete the second subscription. For details, refer to the existing implementation. Details are not described herein.

For example, as shown in FIG. 4, the message 23 in this embodiment of this application may be a subscribe response (subscribe response) message 5. This is not specifically limited in this embodiment of this application.

Optionally, the message 23 in this embodiment of this application may further include indication information 1, and the indication information 1 is used to indicate that the second subscription correlation identifier is a newly added subscription correlation identifier corresponding to the first event. This is not specifically limited in this embodiment of this application. For related descriptions of the indication information 1, refer to the description in step S511 in the embodiment shown in FIG. 5A and FIG. 5B. Details are not described herein again.

Optionally, in this embodiment of this application, after receiving the message 23, the UDM network element may further determine that the second subscription correlation identifier corresponds to a subscription to the second event. In this way, when the NEF network element subsequently modifies or deletes the subscription to the second event, the UDM network element may modify or delete the second subscription based on the second subscription correlation identifier. When the second subscription is modified or deleted, specific information of a terminal in the first user group (for example, a quantity of remaining reports corresponding to the terminal in the first user group) associated with the second subscription may be further modified or deleted. This is not specifically limited in this embodiment of this application.

Optionally, the subscription update method provided in this embodiment of this application may further include the following steps S814 to S815.

S814 and S815 are the same as steps S513 and S514 in the embodiment shown in FIG. 5A and FIG. 5B. For related descriptions, refer to the embodiment shown in FIG. 5A and FIG. 5B. Details are not described herein again.

Optionally, in this embodiment of this application, after the UDM network element deletes the information about the first subscription, corresponding to the scenario in the embodiment shown in FIG. 4, the subscription update method provided in this embodiment of this application may further include the following steps S816, S817a and S818a, and S817b and S818b.

S816 is the same as step S515 in the embodiment shown in FIG. 5A and FIG. 5B. For related descriptions, refer to the embodiment shown in FIG. 5A and FIG. 5B. Details are not described herein again.

S817a and S818a are similar to steps S516a and S517a in the embodiment shown in FIG. 5A and FIG. 5B. For example, a difference lies in the following. In this embodiment of this application, that the AMF 3 network element modifies or deletes the second subscription may include modifying or deleting the second subscription, and modifying or deleting the specific information of the terminal in the first user group that is associated with the second subscription (for example, the quantity of remaining reports corresponding to the terminal in the first user group that is associated with the second subscription) and that is stored in the AMF 3 network element. This is not specifically limited in this embodiment of this application. For other related descriptions, refer to the embodiment shown in FIG. 5A and FIG. 5B. Details are not described herein again.

S817b and S818b are the same as steps S516b and S517b in the embodiment shown in FIG. 5A and FIG. 5B. For related descriptions, refer to the embodiment shown in FIG. 5A and FIG. 5B. Details are not described herein again.

It should be noted that, in the embodiment shown in FIG. 8A and FIG. 8B, an example in which the MM context of the first terminal includes the information about the first subscription is used for description. If the MM context of the first terminal includes information about one or more other subscriptions for the first user group, the message 22 sent by the UDM network element to the AMF 3 network element carries an event notification endpoint corresponding to the one or more other subscriptions for the first user group. For related descriptions, refer to the embodiment shown in FIG. 8A and FIG. 8B. Details are not described herein again.

According to the subscription update method provided in this embodiment of this application, when the first terminal in the first user group is migrated, related processing may be performed on the subscription to the first event such that a network can still continue to perform effective event monitoring for the first terminal. For related descriptions, refer to the part of the foregoing subscription update system. Details are not described herein again.

The actions of the UDM network element or the AMF 3 network element in steps S801 to S818a or S818b may be performed by the processor 301 in the communications device 300 shown in FIG. 3 by invoking the application program code stored in the memory 303. This is not limited in this embodiment.

Optionally, according to the subscription update method shown in FIG. 6, an example in which a first terminal in a first user group moves out of an AMF 1 network element and reselects an AMF 3 network element is used (it may be understood that the following first user group includes one or more terminals, and the following is merely described using an example in which the first terminal in the first user group moves out of the AMF 1 network element and reselects the AMF 3 network element). An embodiment of this application may further provide a subscription update method. The subscription update method is similar to the subscription update method in the embodiment shown in FIG. 8A and FIG. 8B. For example, a difference lies in the following. The group correlation identifier 1 in step S810 and step S812 in the embodiment shown in FIG. 8A and FIG. 8B is replaced with an event notification endpoint 11 corresponding to the first event in this embodiment of this application, and the event notification endpoint 13 in step S811 is the same as the event notification endpoint 11, and the event notification endpoint 11 is used to associate the second subscription with the information about the first subscription. For other related descriptions, refer to the embodiment shown in FIG. 8A and FIG. 8B. Details are not described herein again.

The solutions provided in the embodiments of this application are mainly described from the perspective of interaction between network elements. It may be understood that, to implement the foregoing functions, the second mobility management network element or the unified data management network element includes corresponding hardware structures and/or software modules for performing the functions. A person skilled in the art should easily be aware that, units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the second mobility management network element or the unified data management network element may be obtained through division according to the foregoing method examples. For example, the functional modules may be obtained through division in accordance with the functions, or two or more functions may be integrated into one processing module. The integrated module may be implemented in a form of hardware, or may be implemented in a form of a software functional module. It should be noted that, in this embodiment of this application, module division is an example, and is merely a logical function division. In an embodiment, another division manner may be used.

Figure 9:
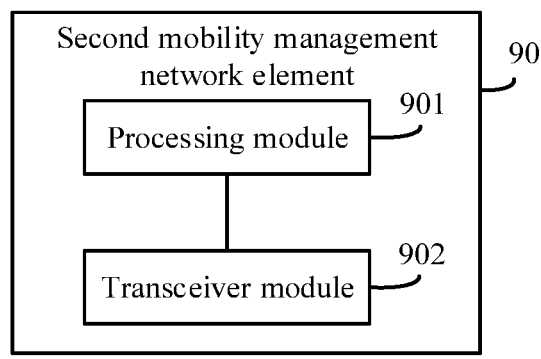
FIG. 9 is a schematic structural diagram of a second mobility management network element according to an embodiment of this application.

For example, the functional modules are obtained through division in an integrated manner. FIG. 9 is a schematic structural diagram of a second mobility management network element 90. The second mobility management network element 90 includes a processing module 901 and a transceiver module 902.

In a possible implementation, the transceiver module 902 is configured to receive event subscription information of a first terminal from a first mobility management network element, where the event subscription information of the first terminal includes information about a first subscription to a first event, the information about the first subscription includes group subscription identification information, the first terminal belongs to a first user group, and the first event is an event subscribed to by a unified data management network element for the first user group, the processing module 901 is configured to allocate a second subscription correlation identifier if the second mobility management network element has no subscription to the first event, and the transceiver module 902 is further configured to send a first message to the unified data management network element, where the first message includes the second subscription correlation identifier and the group subscription identification information.

Optionally, the processing module 901 is further configured to determine, based on the group subscription identification information, that the second mobility management network element has no subscription to the first event. Alternatively, the information about the first subscription further includes a group identifier, the group identifier is used to identify the first user group, and the processing module 901 is further configured to determine, based on the group subscription identification information and the group identifier, that the second mobility management network element has no subscription to the first event.

Optionally, that the processing module 901 is configured to allocate a second subscription correlation identifier includes the following. The processing module 901 is configured to create a second subscription based on the information about the first subscription, and allocate the second subscription correlation identifier to the second subscription.

Optionally, the transceiver module 902 is further configured to receive a second message from the unified data management network element, where the second message carries a second subscription correlation identifier and is used to request to modify or delete the second subscription, and the processing module 901 is further configured to modify or delete the second subscription based on the second message.

In another possible implementation, the transceiver module 902 is configured to receive event subscription information of a first terminal from a first mobility management network element, where the event subscription information of the first terminal includes information about a first subscription to a first event, the information about the first subscription includes group subscription identification information, the first terminal belongs to a first user group, and the first event is an event subscribed to by a unified data management network element for the first user group, the transceiver module 902 is further configured to receive a first message from the unified data management network element, where the first message is used to subscribe to the first event, the first message includes group subscription identification information, and the group subscription identification information is used to associate a second subscription with the information about the first subscription, the second subscription is a subscription to the first event corresponding to the second mobility management network element, the processing module 901 is configured to allocate a second subscription correlation identifier to the second subscription, and the transceiver module 902 is further configured to send the second subscription correlation identifier to the unified data management network element.

Optionally, the processing module 901 is further configured to determine that there is no subscription to the first event. The transceiver module 902 is further configured to send a second message to the unified data management network element, where the second message includes the group subscription identification information, and the group subscription identification information is used by the unified data management network element to learn that the first event needs to be subscribed to from the second mobility management network element.

Optionally, the transceiver module 902 is further configured to receive a sixth message from the unified data management network element, where the sixth message carries the second subscription correlation identifier and is used to request to modify or delete the second subscription, and the processing module 901 is further configured to modify or delete the second subscription based on the second message.

All related content of the steps in the foregoing method embodiments may be cited in function descriptions of a corresponding function module, and details are not described herein again.

In this embodiment, the second mobility management network element 90 is presented with the functional modules divided through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the second mobility management network element 90 may be in the form shown in FIG. 3.

For example, the processor 301 in FIG. 3 may invoke the computer executable instruction stored in the memory 303 such that the second mobility management network element 90 performs the subscription update methods in the foregoing method embodiments.

Specifically, the functions/implementation processes of the transceiver module 902 and the processing module 901 in FIG. 9 may be implemented by the processor 301 in FIG. 3 by invoking the computer executable instruction stored in the memory 303. Alternatively, the function/implementation process of the processing module 901 in FIG. 9 may be implemented by the processor 301 in FIG. 3 by invoking the computer executable instruction stored in the memory 303, and the function/implementation process of the transceiver module 902 in FIG. 9 may be implemented by the communications interface 304 in FIG. 3.

The second mobility management network element 90 provided in this embodiment may perform the foregoing subscription update methods. Therefore, for a technical effect that can be achieved by the second mobility management network element 90, refer to the foregoing method embodiments. Details are not described herein again.

Optionally, an embodiment of this application further provides an apparatus (for example, the apparatus may be a chip system). The apparatus includes a processor configured to support a second mobility management network element in implementing the subscription update method, for example, allocating a second subscription correlation identifier. In a possible design, the apparatus further includes a memory. The memory is configured to store a program instruction and data that are necessary for the second mobility management network element. Certainly, the memory may not be in the apparatus. When the apparatus is a chip system, the apparatus may include a chip, or may include a chip and another discrete component. This is not specifically limited in this embodiment of this application.

Figure 10:
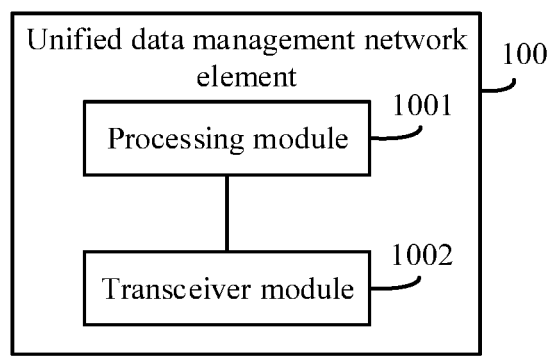
FIG. 10 is a schematic structural diagram of a unified data management network element according to an embodiment of this application.

Alternatively, for example, the functional modules are obtained through division in an integrated manner. FIG. 10 is a schematic structural diagram of a unified data management network element 100. The unified data management network element 100 includes a processing module 1001 and a transceiver module 1002.

In a possible implementation, the transceiver module 1002 is configured to receive a first message from a second mobility management network element, where the first message includes group subscription identification information and a second subscription correlation identifier, the group subscription identification information is used to indicate a subscription to a first event, the second subscription correlation identifier is a subscription correlation identifier allocated by the second mobility management network element to the subscription to the first event, and the first event is an event subscribed to by the unified data management network element for a first user group, and the processing module 1001 is configured to determine, based on the group subscription identification information, that the second subscription correlation identifier corresponds to the subscription to the first event.

Optionally, the processing module 1001 is further configured to determine that the first event needs to be subscribed to for the first user group, and the transceiver module 1002 is further configured to send information about the subscription to the first event to one or more mobility management network elements serving a terminal in the first user group, where the information about the subscription to the first event includes the group subscription identification information.

Optionally, that the processing module 1001 is configured to determine that the first event needs to be subscribed to for the first user group includes the following. The processing module 1001 is configured to receive a subscription to a second event from a capability exposure network element, where the second event is an event subscribed to by the capability exposure network element for the first user group, and determine, based on the second event, that the first event needs to be subscribed to for the first user group.

Optionally, the processing module 1001 is further configured to further determine that the second subscription correlation identifier corresponds to the subscription to the second event, where the second event is an event subscribed to by the capability exposure network element for the first user group.

Optionally, the one or more mobility management network elements include a first mobility management network element, and the first mobility management network element corresponds to a first subscription to the first event. The processing module 1001 is further configured to determine that information about the first subscription needs to be deleted. The processing module 1001 is further configured to delete the information about the first subscription.

Optionally, that the processing module 1001 is configured to determine that the information about the first subscription needs to be deleted includes the following. The processing module 1001 is configured to determine that no terminal in the first user group is registered with the first mobility management network element, or the processing module 1001 is configured to receive a third message from the first mobility management network element, and determine, based on the third message, that the information about the first subscription needs to be deleted.

Optionally, the transceiver module 1002 is further configured to receive a fourth message from a network exposure function network element, where the fourth message is used to request to modify or delete the subscription to the second event, and the second event is an event subscribed to by the capability exposure network element for the first user group, and the transceiver module 1002 is further configured to send, based on the fourth message, a second message to the one or more mobility management network elements serving the terminal in the first user group, where the second message carries a corresponding subscription correlation identifier, and is used to request to modify or delete the subscription to the first event, the mobility management network element serving the terminal in the first user group includes the second mobility management network element, and a subscription correlation identifier corresponding to the second mobility management network element is the second subscription correlation identifier.

In another possible implementation, the processing module 1001 is configured to learn that the first event needs to be subscribed to from the second mobility management network element, where the first event is an event subscribed to by the unified data management network element for the first user group, the transceiver module 1002 is configured to send a first message to the second mobility management network element, where the first message is used to subscribe to the first event, the first message includes group subscription identification information, the group subscription identification information is used to associate the second subscription with the information about the first subscription to the first event, the second subscription is a subscription to the first event corresponding to the second mobility management network element, the information about the first subscription is information in event subscription information of the first terminal that is obtained by the second mobility management network element from the first mobility management network element, and the first terminal belongs to the first user group, and the transceiver module 1002 is further configured to receive a second subscription correlation identifier from the second mobility management network element, where the second subscription correlation identifier is a subscription correlation identifier allocated by the second mobility management network element to the second subscription.

Optionally, that the processing module 1001 is configured to learn that the first event needs to be subscribed to from the second mobility management network element includes the following. The processing module 1001 is configured to receive a second message from the second mobility management network element, where the second message includes group subscription identification information, and learn, based on the group subscription identification information, that the first event needs to be subscribed to from the second mobility management network element.

Optionally, the second message further includes a group identifier, and the group identifier is used to identify the first user group. That the processing module 1001 is configured to learn, based on the group subscription identification information, that the first event needs to be subscribed to from the second mobility management network element includes learning, based on the group identifier and the group subscription identification information, that the first event needs to be subscribed to from the second mobility management network element.

Optionally, the processing module 1001 is further configured to determine that the first event needs to be subscribed to for the first user group, and the transceiver module 1002 is further configured to send information about the subscription to the first event to one or more mobility management network elements serving a terminal in the first user group, where the information about the subscription to the first event includes the group subscription identification information, the one or more mobility management network elements include the first mobility management network element, and the first mobility management network element corresponds to the first subscription.

Optionally, that the processing module 1001 is configured to determine that the first event needs to be subscribed to for the first user group includes the following. The processing module 1001 is configured to receive a subscription to a second event from a capability exposure network element, and determine, based on the second event, that the first event needs to be subscribed to for the first user group.

Optionally, the processing module 1001 is further configured to further determine that the second subscription correlation identifier corresponds to the subscription to the second event, where the second event is an event subscribed to by the capability exposure network element for the first user group.

Optionally, the processing module 1001 is further configured to determine that information about the first subscription needs to be deleted, and the processing module 1001 is further configured to delete the information about the first subscription.

Optionally, that the processing module 1001 is further configured to determine that the information about the first subscription needs to be deleted includes the following. The processing module 1001 is configured to determine that no terminal in the first user group is registered with the first mobility management network element, or the processing module 1001 is configured to receive a fourth message from the first mobility management network element, and determine, based on the fourth message, that the information about the first subscription needs to be deleted.

Optionally, the transceiver module 1002 is further configured to receive a fifth message from a network exposure function network element, where the fifth message is used to request to modify or delete the subscription to the second event, and the second event is an event subscribed to by the capability exposure network element for the first user group, and the transceiver module 1002 is further configured to send, based on the fifth message, a sixth message to the one or more mobility management network elements serving the terminal in the first user group, where the sixth message carries a corresponding subscription correlation identifier, and is used to request to modify or delete the subscription to the first event, the mobility management network element serving the terminal in the first user group includes the second mobility management network element, and a subscription correlation identifier corresponding to the second mobility management network element is the second subscription correlation identifier.

All related content of the steps in the foregoing method embodiments may be cited in function descriptions of a corresponding function module, and details are not described herein again.

In this embodiment, the unified data management network element 100 is presented with the functional modules divided through integration. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the unified data management network element 100 may be in the form shown in FIG. 3.

For example, the processor 301 in FIG. 3 may invoke the computer executable instruction stored in the memory 303 such that the unified data management network element 100 performs the subscription update methods in the foregoing method embodiments.

Specifically, the functions/implementation processes of the transceiver module 1002 and the processing module 1001 in FIG. 10 may be implemented by the processor 301 in FIG. 3 by invoking the computer executable instruction stored in the memory 303. Alternatively, the function/implementation process of the processing module 1001 in FIG. 10 may be implemented by the processor 301 in FIG. 3 by invoking the computer executable instruction stored in the memory 303, and the function/implementation process of the transceiver module 1002 in FIG. 10 may be implemented by the communications interface 304 in FIG. 3.

The unified data management network element 100 provided in this embodiment may perform the foregoing subscription update methods. Therefore, for a technical effect that can be achieved by the unified data management network element 100, refer to the foregoing method embodiments. Details are not described herein again.

Optionally, an embodiment of this application further provides an apparatus (for example, the apparatus may be a chip system). The apparatus includes a processor configured to support a unified data management network element in implementing the subscription update method, for example, determining, based on the group subscription identification information, that the second subscription correlation identifier corresponds to the subscription to the first event. In a possible design, the apparatus further includes a memory. The memory is configured to store a program instruction and data that are necessary for the unified data management network element. Certainly, the memory may not be in the apparatus. When the apparatus is a chip system, the apparatus may include a chip, or may include a chip and another discrete component. This is not specifically limited in this embodiment of this application.

All or some of the foregoing embodiments may be implemented using software, hardware, firmware, or a combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center through a wired (for example, a coaxial cable, an optical fiber, or a digital subscriber line (DSL)) manner or a wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of a plurality. A single processor or another unit may implement several functions listed in the claims. Some measures are described in dependent claims that are different from each other, but this does not mean that these measures cannot be combined to produce a better effect.

Although this application is described with reference to specific features and the embodiments thereof, it is apparent that various modifications and combinations may be made to them without departing from the spirit and scope of this application. Correspondingly, the specification and accompanying drawings are merely examples for description of this application defined by the appended claims, and are considered as any or all of modifications, variations, combinations, or equivalents that cover the scope of this application. Definitely, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A subscription update method comprising:
    receiving, by a second mobility management network element, event subscription information of a first terminal from a first mobility management network element, wherein the event subscription information comprises information about a first subscription to a first event comprising group subscription identification information, wherein the first terminal belongs to a first user group, and wherein the first event is an event subscribed to by a unified data management network element for the first user group;
    allocating, by the second mobility management network element, a subscription correlation identifier when the second mobility management network element has no subscription to the first event;
    sending, by the second mobility management network element to the unified data management network element, a first message comprising the subscription correlation identifier and the group subscription identification information; and
    receiving, by the unified data management network element, the first message from the second mobility management network element.

2. The subscription update method of claim 1, wherein the method further comprises determining, by the second mobility management network element, that the second mobility management network element has no subscription to the first event based on one of the group subscription identification information or a group identifier in the information about the first subscription.

3. The subscription update method of claim 1, wherein the group subscription identification information comprises a group correlation identifier.

4. The subscription update method of claim 1, wherein the group subscription identification information comprises a notification target address.

5. The subscription update method of claim 1, wherein the group subscription identification information comprises a notification target address and a notification correlation identifier.

6. The subscription update method of claim 1, wherein the first message further comprises indication information indicating that the subscription correlation identifier is a newly added subscription correlation identifier corresponding to the first event.

7. The subscription update method of claim 1, wherein allocating, by the second mobility management network element, the subscription correlation identifier comprises:
    creating, by the second mobility management network element, a second subscription based on the information about the first subscription; and
    allocating, by the second mobility management network element, the subscription correlation identifier to the second subscription.

8. The subscription update method of claim 1, wherein before receiving, by the unified data management network element, the first message from the second mobility management network element, the subscription update method further comprises:
    determining, by the unified data management network element, to subscribe to the first event for the first user group; and
    sending, by the unified data management network element, the information about the subscription to the first event to one or more mobility management network elements serving a terminal in the first user group, wherein the information about the subscription to the first event comprises the group subscription identification information.

9. A system, comprising:
    a second mobility management network element configured to:
        receive event subscription information of a first terminal from a first mobility management network element, wherein the event subscription information of the first terminal comprises information about a first subscription to a first event comprising group subscription identification information, wherein the first terminal belongs to a first user group;
        allocate a subscription correlation identifier when the second mobility management network element has no subscription to the first event; and
        send a first message comprising a second subscription correlation identifier and the group subscription identification information; and
    a unified data management network element coupled to the second mobility management network element and configured to receive the first message from the second mobility management network element, wherein the first event is an event subscribed to by the unified data management network element for the first user group.

10. The system of claim 9, wherein the information about the first subscription further comprises a group identifier identifying the first user group, and wherein the second mobility management network element is further configured to determine that the second mobility management network element has no subscription to the first event based on the group subscription identification information and the group identifier.

11. The system of claim 9, wherein the group subscription identification information comprises a notification target address and a notification correlation identifier.

12. The system of claim 9, wherein the first message further comprises indication information indicating that the second subscription correlation identifier is a newly added subscription correlation identifier corresponding to the first event.

13. The system of claim 9, wherein the second mobility management network element is further configured to:
create a second subscription based on the information about the first subscription; and
allocate the second subscription correlation identifier to the subscription.

14. The system of claim 9, wherein the unified data management network element is further configured to:
determine to subscribe to the first event for the first user group; and
send the information about the subscription to the first event to one or more mobility management network elements serving a terminal in the first user group, wherein the information about the subscription to the first event comprises the group subscription identification information.

15. A second mobility management network element, comprising:
a processor; and
a memory coupled to the processor and storing instructions that, when executed by the processor, cause the second mobility management network element to be configured to:
receive event subscription information of a first terminal from a first mobility management network element, wherein the event subscription information of the first terminal comprises information about a first subscription to a first event comprising group subscription identification information, wherein the first terminal belongs to a first user group, and wherein the first event is an event subscribed to by a unified data management network element for the first user group;
allocate a subscription correlation identifier when the second mobility management network element has no subscription to the first event; and
send a first message to the unified data management network element comprising the subscription correlation identifier and the group subscription identification information to the unified data management network element.

16. The second mobility management network element of claim 15, wherein the instructions further cause the second mobility management network element to be configured to determine that the second mobility management network element has no subscription to the first event based on the group subscription identification information, or wherein the information about the first subscription further comprises a group identifier identifying the first user group, and wherein instructions further cause the second mobility management network element to be configured to determine that the second mobility management network element has no subscription to the first event based on the group subscription identification information and the group identifier.

17. The second mobility management network element of claim 15, wherein the instructions that cause the second mobility management network element to be configured to allocate further cause the second mobility management network element to:
create a second subscription based on the information about the first subscription; and
allocate the subscription correlation identifier to the second subscription.

18. The second mobility management network element of claim 15, wherein the group subscription identification information comprises a notification target address and a notification correlation identifier.

19. The second mobility management network element of claim 15, wherein the first message further comprises indication information indicating that the subscription correlation identifier is a newly added subscription correlation identifier corresponding to the first event.

20. The second mobility management network element of claim 15, wherein the instructions further cause the second mobility management network element to be configured to:
receive a second message from the unified data management network element that carries the subscription correlation identifier and requests to modify or delete a second subscription; and
modify or delete the second subscription based on the second message.

21. A subscription update method comprising:
receiving, by a second mobility management network element, event subscription information of a first terminal from a first mobility management network element, wherein the event subscription information comprises information about a first subscription to a first event comprising group subscription identification information, wherein the first terminal belongs to a first user group, and wherein the first event is an event subscribed to by a unified data management network element for the first user group;
allocating, by the second mobility management network element, a subscription correlation identifier when the second mobility management network element has no subscription to the first event; and
sending, by the second mobility management network element to the unified data management network element, a first message comprising the subscription correlation identifier and the group subscription identification information.

22. The subscription update method of claim 21, further comprising determining, by the second mobility management network element, that the second mobility management network element has no subscription to the first event based on one of the group subscription identification information or a group identifier in the information about the first subscription.

23. The subscription update method of claim 21, wherein the group subscription identification information comprises a group correlation identifier, a notification target address, or both the notification target address and a notification correlation identifier.

24. The subscription update method of claim 21, wherein the first message further comprises indication information indicating that the subscription correlation identifier is a newly added subscription correlation identifier corresponding to the first event.

25. The subscription update method of claim 21, wherein allocating, by the second mobility management network element, the subscription correlation identifier comprises:
creating, by the second mobility management network element, a second subscription based on the information about the first subscription; and
allocating, by the second mobility management network element, the subscription correlation identifier to the second subscription.

* * * * *